(12) United States Patent
Crampton et al.

(10) Patent No.: US 8,353,059 B2
(45) Date of Patent: Jan. 8, 2013

(54) OPTICAL SCANNING PROBE

(75) Inventors: Stephen James Crampton, Greater London (GB); Peter Champ, Pinner Middlesex (GB)

(73) Assignee: Metris N.V., Leuven (BE)

( * ) Notice: Subject to any disclaimer, the term of this patent is extended or adjusted under 35 U.S.C. 154(b) by 8 days.

(21) Appl. No.: 13/177,227

(22) Filed: Jul. 6, 2011

(65) Prior Publication Data

US 2012/0026510 A1 Feb. 2, 2012

Related U.S. Application Data

(62) Division of application No. 12/298,688, filed as application No. PCT/EP2007/054116 on Apr. 26, 2007, now Pat. No. 8,117,668.

(60) Provisional application No. 60/795,459, filed on Apr. 27, 2006.

(30) Foreign Application Priority Data

Apr. 27, 2006 (EP) .................................. 06252270

(51) Int. Cl.
*G12B 21/02* (2006.01)
(52) U.S. Cl. ........................................................ 850/9
(58) Field of Classification Search ... 850/9; 359/201.1, 359/201.2
See application file for complete search history.

(56) References Cited

U.S. PATENT DOCUMENTS

| | | | |
|---|---|---|---|
| 3,994,798 A | 11/1976 | Westerlund | |
| 4,739,394 A | 4/1988 | Oda et al. | |
| 5,193,120 A | 3/1993 | Gamache et al. | |
| 5,402,582 A | 4/1995 | Raab | |
| 5,829,148 A | 11/1998 | Eaton | |
| 6,366,831 B1 | 4/2002 | Raab | |
| 7,463,138 B2 | 12/2008 | Pawlicki et al. | |
| 8,238,012 B2 * | 8/2012 | Kobayashi | 359/201.1 |
| 2002/0140949 A1 | 10/2002 | Sasaki et al. | |
| 2005/0237423 A1 | 10/2005 | Nilson et al. | |

FOREIGN PATENT DOCUMENTS

| | | |
|---|---|---|
| DE | 19639999 A1 | 3/1998 |
| DE | 10333493 A1 | 2/2005 |
| FR | 2693003 A1 | 12/1993 |
| JP | 56100306 A | 8/1981 |

(Continued)

OTHER PUBLICATIONS

International search report from PCT/EP2007/054116, Dec. 9, 2007.

*Primary Examiner* — Kiet T Nguyen
(74) *Attorney, Agent, or Firm* — Marshall, Gerstein & Borun LLP

(57) ABSTRACT

The present invention relates to a scanning probe (2) for capturing data from a plurality of points on the surface of an object by irradiating the object with a light stripe and detecting light reflected from the object surface, the scanning probe comprising (a) stripe generating means (14) for generating and emitting a light stripe (55); (b) a camera (16) comprising an imaging sensor having an array of pixels to detect the light stripe reflected from the object surface; (c) means for adjusting the intensity of the light stripe (55) during acquisition of the frame, in dependence upon the intensities detected by the camera (16). It also relates to a means to modify the stripe length, a scanner with separate compartment for the processing means, and an attachable dust cover for a scanner.

6 Claims, 9 Drawing Sheets

FOREIGN PATENT DOCUMENTS

| | | |
|---|---|---|
| JP | 62088906 A | 4/1987 |
| JP | 6-300539 A | 10/1994 |
| JP | 2000-097629 A | 4/2000 |
| JP | 2002-296017 A | 10/2002 |
| JP | 2003-107389 A | 4/2003 |
| JP | 2003-194526 A | 7/2003 |
| JP | 2003189163 A | 7/2003 |
| JP | 2005-351851 A | 12/2005 |
| WO | WO-97/05449 | 2/1997 |
| WO | WO-2004/096502 A1 | 11/2004 |

\* cited by examiner

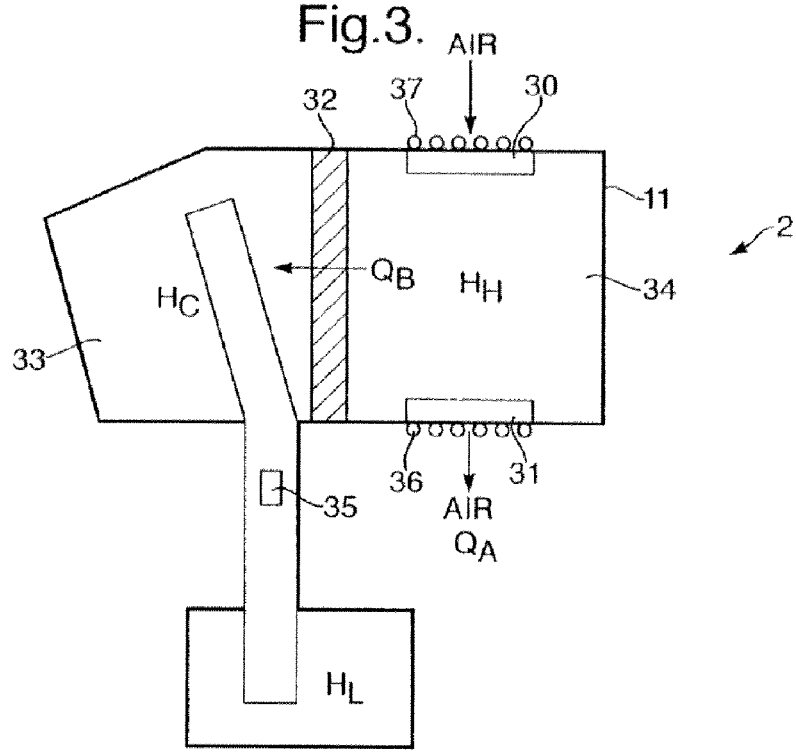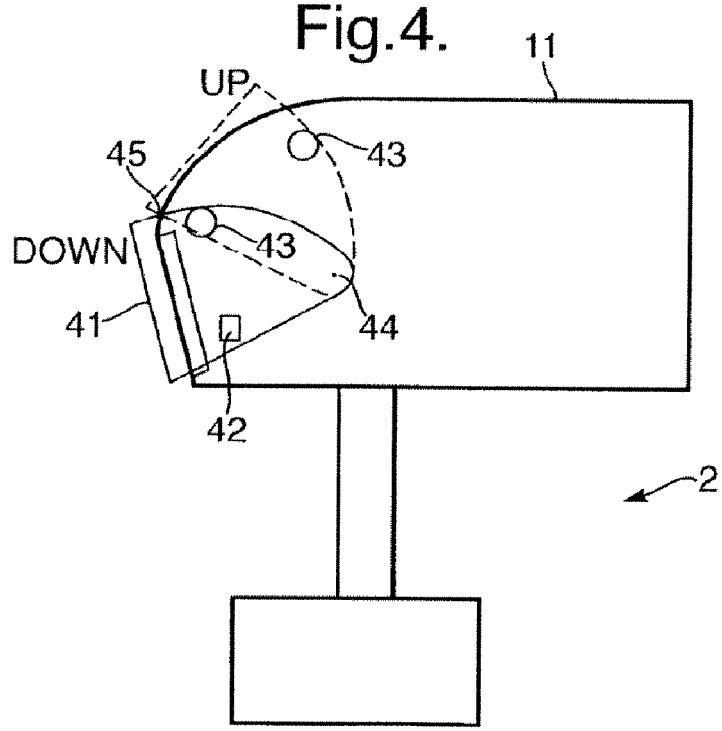

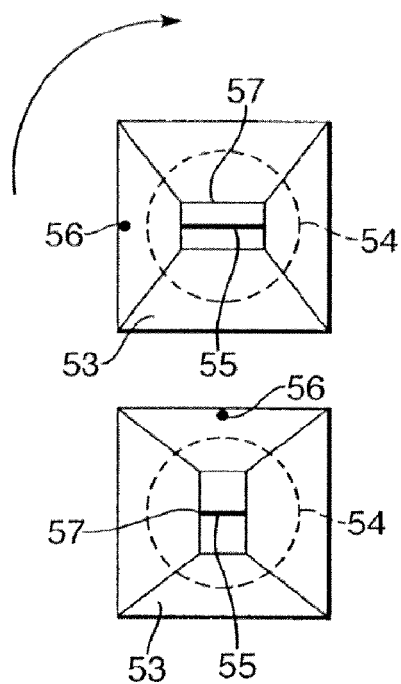
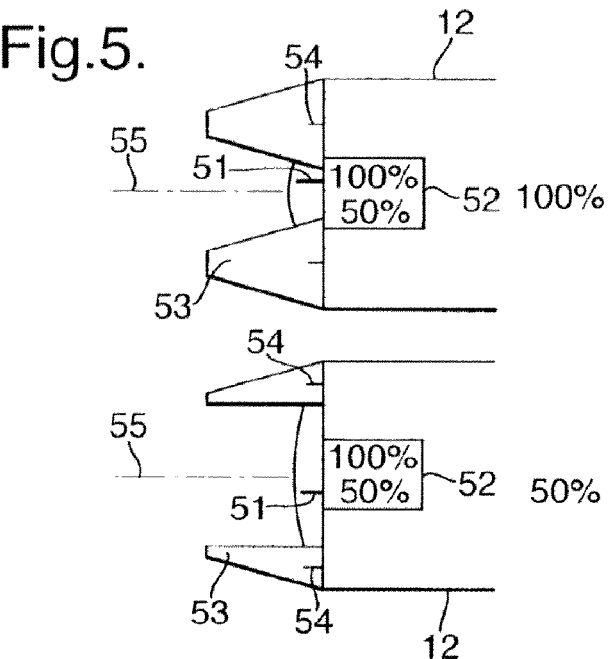
Fig.5.
Fig.6A.
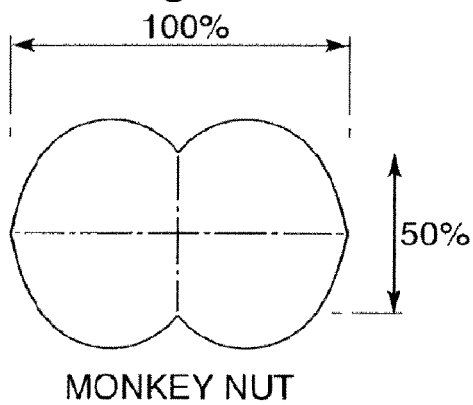
MONKEY NUT
Fig.6B.
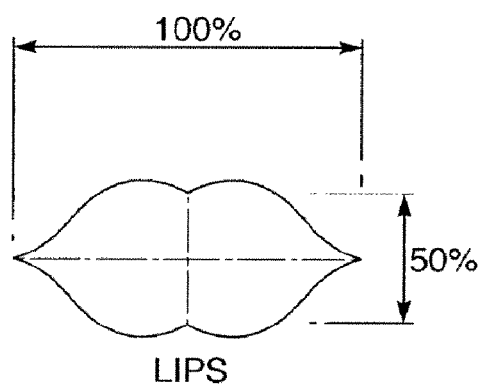
LIPS

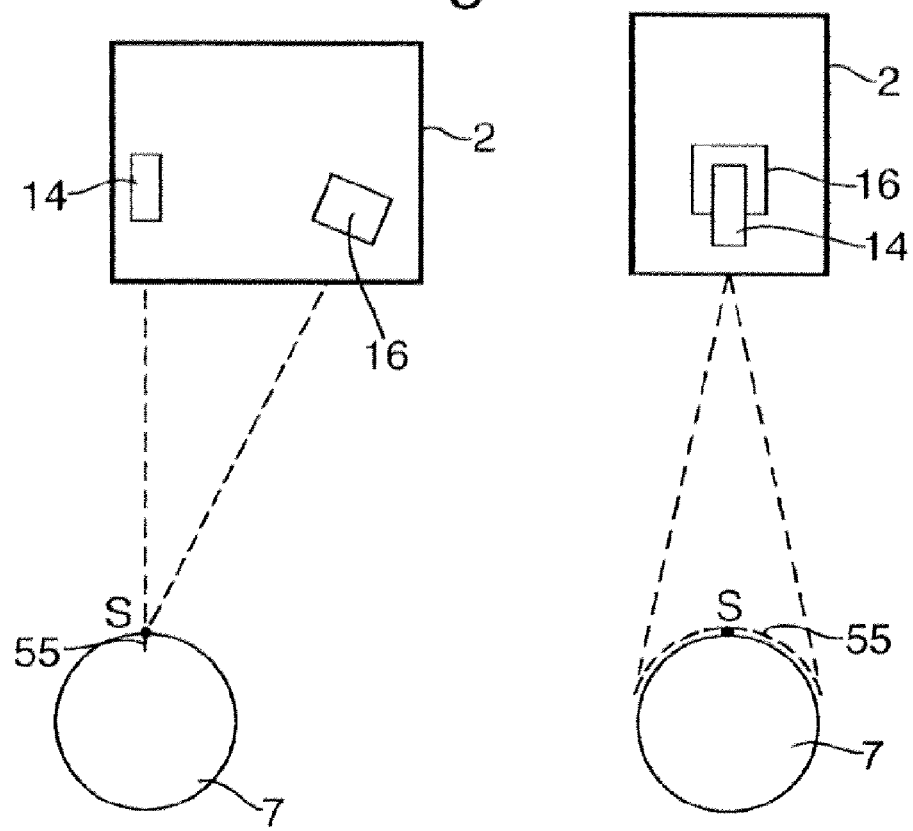

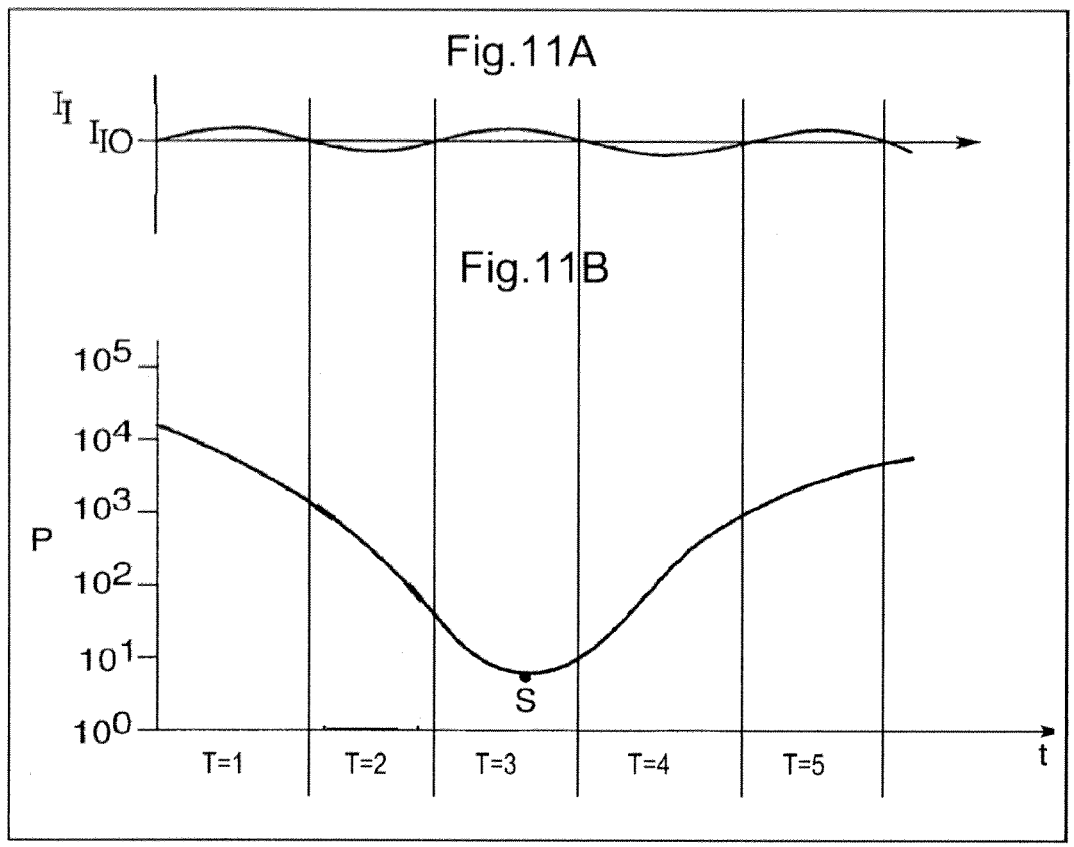
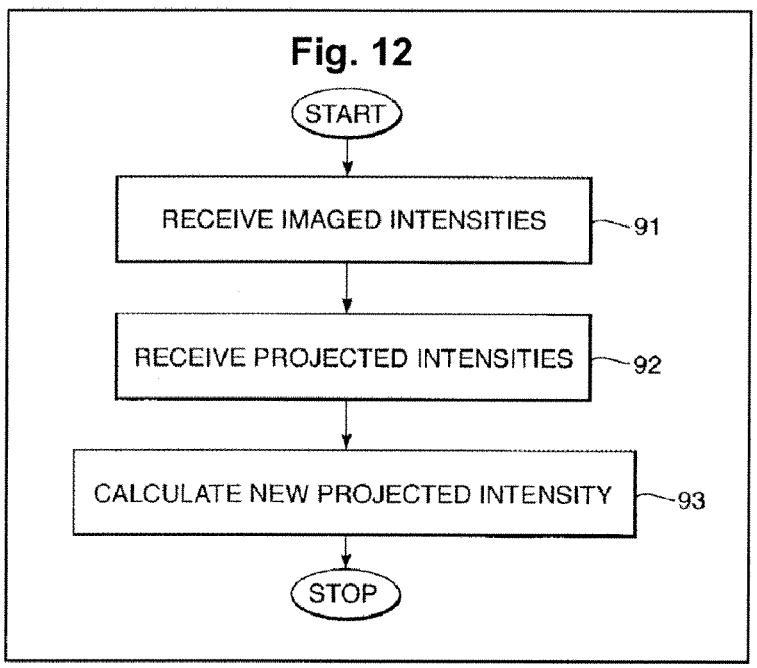

OPTICAL SCANNING PROBE

FIELD OF THE INVENTION

The present invention concerns non-contact optical scanning.

BACKGROUND TO THE INVENTION

Scanning Probes

Scanning probes are non-contact optical probes for measuring thousands of points a second on the 3D surface shape of an object. There are three broad types of scanning probe: point, stripe and area. This invention concerns stripe scanning probes. Most stripe scanning probes use the principal of optical triangulation. Stripe scanning probes are provided or are being developed by Metris (Belgium), 3D Scanners (UK), Romer (France), Faro Technologies (USA), Perceptron (USA), Steinbichler (Germany), Pulstec (Japan), Micro Epsilon (Germany), SICK IVP (Germany), Vitana (Canada), Laser Design (USA), Datapixel (Spain), Optimet (Israel) and Kreon (France) amongst others.

Movement of Stripe Scanning Probes

In order to scan the surface of an object a stripe scanning probe needs to move over the object's surface in a similar way to how a paintbrush is used for painting a surface. The movement of the stripe scanning probe may be accomplished manually or by automated equipment.

Localisers for Stripe Scanning Probes

In order to get accurate data of the surface of an object, a localiser is required to register the position and orientation of the stripe scanning probe when surface data is captured by the stripe scanning probe. Localisers are generally mechanical or remote. Localisers may also have the dual functionality of supporting/moving the probe as well as supplying its position and orientation. Mechanical localisers include: 3-axis Cartesian coordinate measurement machines (CMMs), Manual CMM arms, Robot CMM arms and essentially all types of combinations of continuous mechanical linkages that might accurately register the position and orientation of a probe end relative to a base end, the stripe scanning probe being rigidly attached to the probe end. Remote localisers include: optical trackers, optical CMMs, magnetic trackers and GPS systems. Remote localisers often require one or more lines of sight between the stripe scanning probe and the remote localiser equipment.

Since the 1970's, companies have been building manually operable CMM arms that have recently achieved a measuring accuracy using a contact probe of between 0.025 mm (+/−2 Sigma) and 0.005 mm (+/−2 Sigma) depending, mainly, on the reach of the Manual CMM Arm, Manual CMM Arms are expected to become more accurate with further development. These Manual CMM Arms are now accurate enough for many measurement requirements and area growing sector in the measurement marketplace. They have the flexibility of being able to get into areas with difficult access. Manual CMM Arms are acceptably accurate for many applications, but are not automated; they are expensive to operate, particularly since a semi-skilled operator is required; human operators are also subject to human error. Manual CMM Arms are provided by companies including: Hexagon Cimcore (USA), Faro Technologies (USA), Hexagon Romer (France), Zett Mess Technik (Germany) and Tokyo Boeki (Japan). As examples, U.S. Pat. No. 3,994,798 Eaton, U.S. Pat. No. 5,402,582 Raab assigned to Faro Technologies, U.S. Pat. No. 5,829,148 Eaton and U.S. Pat. No. 6,366,831 Raab assigned to Faro Technologies disclose background information on Manual CMM Arms.

Stripe Scanning Probes on Manual CMM Arms

Stripe scanning probes on Manual CMM Arms were disclosed by Crampton, an inventor of the present invention, in several patent applications including PCT/GB96/01868. Stripe scanning probes for Manual CMM Arms are provided or are being developed by Metris, 3D Scanners, Romer, Faro Technologies, Perceptron, Steinbichler, Pulstec and Kreon amongst others. As yet, a measurement accuracy standard does not exist that defines the way accuracy should be measured for Stripe scanning probes. The marketplace is in the situation of not being able to perform standard tests to verify accuracy and enable comparison between stripe scanning probe types in a practical way. Stripe scanning probes have become accurate, largely because their measuring range is short. In general, stripe scanning probes gather measurement data over a measuring range of the order of 20-400 mm. This is often at a standoff to the end of the Manual CMM Arm. The accuracy of the best Manual CMM Arms combined with the best Stripe scanning probes is already better than 0.050 mm (+/−2 Sigma) and can be better than 0.010 mm (+/−2 Sigma) for short measuring ranges. Stripe scanning probes are generally mounted offset on the side of the Manual CMM Arm or mounted on the probe end of it. Stripe scanning probes are usually quickly dismountable from a Manual CMM Arm using a mounting system that is mechanically repeatable to an acceptable degree of accuracy.

Robot CMM Arms and their use with stripe scanning probes were disclosed by Crampton, an inventor of the present invention, in several patent applications including PCT/GB2004/001827, Robot CMM Arms have the advantage over Manual CMM Arms of supporting and moving the stripe scanning probe automatically. Both Manual CMM Arms and Robot CMM Arms have the advantage over Cartesian CMMs of articulation.

Market Needs

Accuracy: Users demand ever higher accuracy and data quality from their stripe scanning probes.

Speed: When surfaces are scanned, they are sampled. The quality and automation of the surface reconstruction or measurement is related to the number and density of raw points scanned. Scanning rates of current sensors on the market are typically 3,000 to 20,000 points per second. Rates exceeding 200,000 points per second will increase the productivity of the stripe scanning probes by reducing both data capture time and manual intervention in the post-processing activity.

Cabling: a stripe scanning probe with fewer cables has higher utility than a stripe scanning probe with lots of cables. Cables are an ever increasing proportion of the cost of CMMs.

Compactness: it is desirable to provide a stripe scanning probe with built in processing and without an extra box of electronics and associated cables.

Cost: the market place is becoming more competitive and reductions in cabling, components are desirable to reduce the manufacturing cost of stripe scanning probes.

Current Situation

The vast majority of stripe scanning probes on the market are analogue and use video CCD imaging sensors. This state of the art imaging technology has limited the accuracies, data quality, speeds, cost and compactness of the solutions.

SUMMARY OF SOME EMBODIMENTS OF THE INVENTION

One embodiment of the invention relates to a scanning probe (2) for capturing data from a plurality of points on the surface of an object by irradiating the object with a light stripe and detecting light reflected from the object surface, the scanning probe comprising:
(a) stripe generating means (14) for generating and emitting a light stripe (55);
(b) a camera (16) comprising an imaging sensor having an array of pixels to detect the light stripe reflected from the object surface;
(c) means for adjusting the intensity of the light stripe (55) during acquisition of a single frame, in dependence upon the intensities detected by the camera (16).

Another embodiment of the invention relates to a scanning probe (2) as described above, wherein:
the camera (16) and/or stripe generating means (14) are configured such that different subsets of the imaging sensor pixels at different times detect light reflected from the stripe during the acquisition of the frame, the different subsets corresponding to different positions on the detected light stripe,
the means for adjusting the intensity of the light is configured to adjust the intensity during acquisition of the frame, in dependence upon the intensities detected by the subset of pixels.

Another embodiment of the invention relates to a scanning probe (2) as described above, whereby the imaging sensor is a CMOS equipped with a rolling shutter, wherein:
the rolling shutter is configured such that different subsets of the sensor pixels at different times detect light reflected from the stripe during the acquisition of the frame, the different subsets corresponding to different positions on the detected light stripe, and
the stripe generating means (14) is configured to generate a stripe of unvariable intensity across the length of the stripe which overall intensity is adjustable during acquisition of the frame, in dependence upon the intensities detected by the subset of pixels.

Another embodiment of the invention relates to a scanning probe (2) as described above, wherein the stripe generating means (14) comprises static optics.

Another embodiment of the invention relates to a scanning probe (2) as described above, wherein the stripe generating means (14) comprises a laser and solid cylindrical optics.

Another embodiment of the invention relates to a scanning probe (2) as described above, wherein the stripe generating means (14) comprises a laser and a micro-mirror array.

Another embodiment of the invention relates to a scanning probe (2) as described above, wherein the means for adjusting the intensity of the light is arranged to set the intensity for each subset of pixels in dependence upon:
the light detected by the pixel(s) in that subset for at least one previously projected light stripe, and
the intensity of the light emitted for that subset in at least one previously projected light stripe.

Another embodiment of the invention relates to a scanning probe (2) as described above, wherein:
the stripe generating means (14) is configured to generate a stripe (55) comprising a plurality of spots whose individual intensities are adjustable during acquisition of a single frame, and
the spots are separately projected so that different subsets of the sensor pixels at different times detect light reflected from the stripe during the acquisition of the frame, the different subsets corresponding to different positions on the detected light stripe,
the individual spot intensities are adjusted in dependence upon the intensities detected by the subset of pixels.

Another embodiment of the invention relates to a scanning probe (2) as described above, wherein the stripe generating means (14) comprises a laser and a micro-mirror array.

Another embodiment of the invention relates to a scanning probe (2) as described above, wherein the stripe generating means (14) comprises moving optics.

Another embodiment of the invention relates to a scanning probe (2) as described above, wherein the stripe generating means (14) comprises a laser and a moving mirror.

Another embodiment of the invention relates to a scanning probe (2) as described above, whereby the imaging sensor is a CMOS equipped with a rolling shutter, or a CCD.

Another embodiment of the invention relates to a scanning probe (2) as described above, wherein the means for adjusting the intensity of the light is arranged to set the intensity of spots within a projected stripe for each subset of pixels in dependence upon:
the light detected by the pixel(s) in that subset for at least one previously projected spot in the stripe, and
the intensity of the light emitted for that subset in at least one previously projected spot in the stripe.

Another embodiment of the invention relates to a scanning probe (2) as described above, further comprising means for adjusting the exposure time for a subset of the pixels in dependence upon the light intensity set for the subset.

Another embodiment of the invention relates to a method of capturing data from a plurality of points on the surface of an object by irradiating the object with a light stripe and detecting light reflected from the object surface, the method comprising:
(a) generating and emitting a light stripe;
(b) detecting the light stripe reflected from the object surface using an imaging sensor comprising an array of pixels,
(c) adjusting the intensity of the light during acquisition of a single frame in dependence upon the intensity of light detected by the pixels.

Another embodiment of the invention relates to a method as described above, wherein:
different subsets of the imaging sensor pixels at different times detect light reflected from the stripe during the acquisition of the frame, the different subsets corresponding to different positions on the detected light stripe, to determine the light detected by the pixel(s) in each subset; and
the intensity of the light during acquisition of the frame is adjusted in dependence upon the intensity of light detected by the subset of pixels.

Another embodiment of the invention relates to a method as described above, whereby the stripe is detected using a CMOS imaging sensor equipped with a rolling shutter allowing different subsets of the sensor pixels at different times to detect light reflected from the stripe during the acquisition of the frame, the different subsets corresponding to different positions on the detected light stripe, and
the stripe generating means generates a stripe of unvariable intensity across the length of the stripe which overall intensity is adjusted during acquisition of a single frame.

Another embodiment of the invention relates to a method as described above, whereby wherein the stripe generating means comprises static optics.

Another embodiment of the invention relates to a method as described above, wherein the stripe generating means comprises a laser and solid cylindrical optics.

Another embodiment of the invention relates to a method as described above, wherein the stripe generating means comprises a laser and a micro-mirror array.

Another embodiment of the invention relates to a method as described above, wherein the intensity of the light is further adjusted by setting the intensity for each subset of pixels in dependence upon:
the light detected by the pixel(s) in that subset for at least one previously projected light stripe, and
the intensity o he light emitted for that subset in at least one previously projected light stripe.

Another embodiment of the invention relates to a method as described above, wherein:
the stripe generating means generates a stripe comprising a plurality of spots whose individual intensities are adjustable during acquisition of a single frame, and
the spots are separately projected no that different subsets of the sensor pixels at different times detect light reflected from the stripe during the acquisition of the frame, the different subsets corresponding to different positions on the detected light stripe,
the individual spot intensities are adjusted in dependence upon the intensities detected by the subset of pixels.

Another embodiment of the invention relates to a method as described above, wherein the stripe generating means comprises a laser and a micro-mirror array.

Another embodiment of the invention relates to a method as described above, wherein the stripe generating means (14) comprises moving optics.

Another embodiment of the invention relates to a method as described above, wherein the stripe generating means comprises a laser and a moving mirror.

Another embodiment of the invention relates to a method as described above, wherein the imaging sensor is a CMOS camera equipped with a rolling shutter, or a CCD.

Another embodiment of the invention relates to a method as described above, wherein the intensity of the light is further adjusted by setting the intensity within a projected stripe for each subset of pixels in dependence upon:
the light detected by the pixel(s) in that subset for at least one previously projected spot in the stripe, and
the power of the light emitted for that subset in at least one previously projected spot in the stripe.

Another embodiment of the invention relates to a method as described above, further comprising adjusting the exposure time for a subset of the pixels in dependence upon the light power set for the subset.

Another embodiment of the invention relates to a scanning probe for capturing data from a plurality of points on the surface of the object by irradiating the object with a light stripe and detecting light reflected from the object surface, the scanning probe comprising:
(a) stripe generating means for generating a light stripe;
(b) an imaging sensor to detect the light stripe reflected from the object surface; and
(c) an aperture through which the light stripe generated by the stripe generating means is emitted, the aperture being variable to provide an aperture of a first width and an aperture of a second width through which the light stripe must pass such that light stripes of different lengths are generated when the aperture is arranged at its different widths.

Another embodiment of the invention relates to the scanning probe as described above, wherein the aperture is of non-circular shape and is variable by rotation relative to the light stripe to provide the aperture of first and second widths.

Another embodiment of the invention relates to the scanning probe as described above, wherein the aperture is manually variable.

Another embodiment of the invention relates to the scanning probe as described above, further comprising:
means for detecting whether the aperture is set to the first width or the second width; and
means for setting the detection frame rate of the imaging sensor in dependence upon the determined width.

Another embodiment of the invention relates to the scanning probe as described above, further comprising means for varying the aperture in response to user input instructions.

Another embodiment of the invention relates to the scanning probe as described above, further comprising means for setting the detection frame rate of the imaging sensor in dependence upon the user input instructions.

Another embodiment of the invention relates to a scanning probe for capturing data from a plurality of points on the surface of an object by irradiating the object with light and detecting light reflected from the object surface, the scanning probe comprising:
(a) light generating means for generating and emitting light;
(b) an imaging sensor to detect light reflected from the object surface; and
(c) data processing means operable to process signals from the imaging sensor;
wherein the data processing means is provided in a compartment separated from the light generating means and the imaging sensor.

Another embodiment of the invention relates to a scanning probe as described above, wherein the imaging sensor and the data processing means are provided in a first enclosure and the light generating means is provided in a separate second enclosure, the first and second enclosures being rigidly connected together.

Another embodiment of the invention relates to a scanning probe as described above, wherein the compartment of the data processing means is separated from the imaging sensor by a barrier with high thermal resistance to thermally insulate the data processing means from the imaging sensor.

Another embodiment of the invention relates to a scanning probe as described above, wherein the light generating means, the imaging sensor, and the data processing means are provided in a single enclosure, and wherein the compartment of the data processing means is separated from the light generating means and the imaging sensor by a barrier with high thermal resistance to thermally insulate the data processing means from the light generating means and the imaging sensor.

Another embodiment of the invention relates to a scanning probe as described above, wherein the compartment containing the data processing means has an air inlet, an air outlet, and a fan arranged to draw air into the compartment through the air inlet and to expel air from the compartment through the air outlet.

Another embodiment of the invention relates to a scanning probe for capturing data from a plurality of points on the surface of the object by irradiating the object with light and detecting light reflected from the object surface, the scanning probe comprising:
(a) light generating means for generating and emitting light;
(b) an imaging sensor having a plurality of pixels to detect light reflected from the object surface through an imaging window; and
(c) a visor moveable between a closed position in which the visor covers the imaging window and an open position in which the visor does not cover the imaging window.

Another embodiment of the invention relates to a scanning probe as described above, further comprising means for detecting when the visor is in the closed position and means for inhibiting operation of the probe when it is detected that the visor is in the closed position.

Another embodiment of the invention relates to a scanning probe as described above, further comprising means for detecting when the visor is in the closed position and means for warning the user when it is detected that the visor is in the closed position.

Another embodiment of the invention relates to a scanning probe as described above, further comprising means for locking the visor in the open position and the closed position, respectively.

Another embodiment provides a digital stripe scanning probe for operation with a localiser to accurately record thousands of 3D points per second on the surface of an object.

In a first embodiment of the present invention, the digital stripe scanning probe comprises:
- an imaging sensor which may optionally be digitally addressable;
- two separate enclosures for stripe projection and stripe imaging, that are rigidly connected together;
- connection to a computer without the need for an intermediate box for specialist processing.

In an alternative embodiment of the present invention, the digital stripe scanning probe comprises a single enclosure.

In another embodiment of the present invention, the imaging sensor in the digital stripe scanning probe is a CMOS sensor.

In another embodiment of the present invention, the imaging sensor in the digital stripe scanning probe is a CCD sensor, In an embodiment, digital cables are used to transfer data. Digital cables are cheaper and more compact than analogue video cables. Furthermore, the use of digital cables results in reduced background noise during data transmission.

In a further embodiment of the present invention, the data connection between the digital stripe scanning probe and the computer is a standard bus such as Ethernet; the digital stripe scanning probe has an IP address.

In a further embodiment of the present invention, the stripe imaging enclosure of the digital stripe scanning probe comprises a hot compartment and a cold compartment separated by a barrier with high thermal resistance.

In a further embodiment of the present invention, a fan is provided in the hot compartment of the digital stripe scanning probe and the hot compartment is sealed.

In another embodiment of the present invention, a fan is provided in the hot compartment of the digital stripe scanning probe and the hot compartment is through-flow with a dust filter on the input.

In another embodiment of the present invention, the stripe is a laser stripe. The stripe may be created with static optics or with moving optics.

In a further embodiment the power of the stripe is controlled over time. This may give rise to stripes whose intensity is unvariable across the stripe, but which intensity can be raised or lowered. It may also give rise to a stripe whose intensity is variable across the stripe (e.g. more intense in the centre or the edges).

In another embodiment of the present invention, the sensor is a CMOS sensor that has a rolling shutter and the timing of the rolling shutter is controlled and synchronised with the power of the light stripe providing a large degree of control over the intensity of each imaged stripe or point along the stripe.

In another embodiment of the invention, the sensor is a regular CCD working as a snapshot buffer and is synchronised with the power of the light stripe providing a large degree of control over the intensity of each imaged stripe or point along the stripe In a further embodiment of the present invention, the imaged intensity from a previous stripe is used adaptively to adjust the light power at each point along the current stripe such that near-optimum signal to noise is attained and the data quality is maximised.

In another embodiment of the present invention, the stripe is created with moving optics. The moving optics may comprise a laser and moving mirror that generates a flying spot. The intensity of the flying spot may be adjusted within a sweep to give rise to a stripe whose intensity is variable across the stripe. Alternatively, intensity of the flying spot may be adjusted between sweeps to give rise to a stripe whose intensity is unvariable (i.e. almost uniform) across the stripe, but which intensity can be raised or lowered. The flying spot may be synchronised with the rolling shutter. The former and latter arrangements give rise to a stripe whose intensity is unvariable across the stripe, but which intensity can be raised or lowered.

In another embodiment of the present invention, the stripe is created with static optics. The static optics are devoid of the mechanical parts associated with, for example, a moving mirror. A static optics may comprise a laser and a solid state micro-mirror array, or a laser and solid cylindrical optics. Static optics are capable of generating a stripe whose intensity is unvariable across the stripe, but which intensity can be raised or lowered. The micro-mirror is capable of projecting a stripe whose intensity is variable across the stripe because the array projects the stripe as a plurality of spots whose individual intensities can be adjusted.

In a particular embodiment of the present invention, the sensor is a CMOS sensor that has a rolling shutter, the stripe is created using static optics, the timing of the rolling shutter is controlled and synchronised with the power of the light stripe, and the light power across the stripe is controlled by the laser.

In a particular embodiment of the invention, the sensor is a regular CCD working as a snapshot buffer is used, the stripe is created with static optics and the light power in the stripe is controlled in the stripe by a micro-mirror array.

In a particular embodiment of the invention, the sensor is a regular CCD working as a snapshot buffer is used, the stripe is created with moving optics and the light intensity within the stripe is controlled by the laser in combination with a moving mirror.

In a further embodiment of the present invention, a tracking window that follows the stripe is used to increase the speed of scanning.

In another embodiment of the present invention, a manually rotatable stripe trimmer with multiple positions is provided for projecting different stripe lengths.

In another embodiment of the present invention, a manually positionable visor is provided for protecting the imaging window. A sensor is also provided for detecting whether the visor is open or closed.

One other embodiment of the invention is a scanning probe for capturing data from a plurality of points on the surface of an object by irradiating the object with a light stripe and detecting light reflected from the object surface, the scanning probe comprising:
(a) stripe generating means for generating and emitting a light stripe;
(b) an addressable imaging sensor having a plurality of pixels to detect the light stripe reflected from the object surface;

(c) sensor reading means for reading a different subset of the imaging sensor pixels at different times, the different subsets corresponding to different positions on the detected light stripe, to determine the light detected by the pixel(s) in each subset; and (d) means for adjusting the power of the light in dependence upon the subset of pixels read by the sensor reading means.

Another embodiment of the invention is a scanning probe as defined above, wherein the means for adjusting the power of the light is arranged to set the power for each subset of pixels in dependence upon the light detected by the pixel(s) in that subset for at least one previously projected light stripe and the power of the light emitted for that subset in at least one previously projected light stripe.

Another embodiment of the invention is a scanning probe as defined above, further comprising means for adjusting the exposure time for a subset of the pixels in dependence upon the light power set for the subset.

Another embodiment of the invention is a scanning probe as defined above, wherein the imaging sensor comprises a two-dimensional array of pixels, and the sensor reading means is arranged to read subsets of pixels such that each subset comprises a full line of pixels in the two-dimensional array.

Another embodiment of the invention is a scanning probe as defined above, wherein the light stripe generating means comprises static optics to generate and emit a light stripe.

Another embodiment of the invention is a scanning probe as defined above, wherein the light stripe generating means comprises a moving mirror to generate a light stripe by reflecting a light spot.

Another embodiment of the invention is a method of capturing data from a plurality of points on the surface of an object by irradiating the object with a light stripe and detecting light reflected from the object surface, the method comprising:

(a) generating and emitting a light stripe;

(b) detecting the light stripe reflected from the object surface using an addressable imaging sensor having a plurality of pixels;

(c) reading a different subset of the imaging sensor pixels at different times, the different subsets corresponding to different positions on the detected light stripe, to determine the light detected by the pixel(s) in each subset; and (d) adjusting the power of the light in dependence upon the subset of pixels read.

Another embodiment of the invention is a method as defined above, wherein the power of the light is adjusted by setting the power for each subset of pixels in dependence upon the light detected by the pixel(s) in that subset for at least one previously projected light stripe and the power of the light emitted for that subset in at least one previously projected light stripe.

Another embodiment of the invention is a method as defined above, further comprising adjusting the exposure time for a subset of the pixels in dependence upon the light power set for the subset.

Another embodiment of the invention is a method as defined above, wherein the light stripe reflected from the object surface is detected using an imaging sensor comprising a two-dimensional array of pixels, and wherein the subsets of pixels are read such that each subset comprises a full line of pixels in the two-dimensional array.

Another embodiment of the invention is a method as defined above, wherein the light stripe is generated using static optics.

Another embodiment of the invention is a method as defined above, wherein the light stripe is generated by reflecting a light spot using a moving mirror.

Another embodiment of the invention is a scanning probe for capturing data from a plurality of points on the surface of the object by irradiating the object with a light stripe and detecting light reflected from the object surface, the scanning probe comprising:

(a) stripe generating means for generating a light stripe;

(b) an imaging sensor to detect the light stripe reflected from the object surface; and (c) an aperture through which the light stripe generated by the stripe generating means is emitted, the aperture being variable to provide an aperture of a first width and an aperture of a second width through which the light stripe must pass such that light stripes of different lengths are generated when the aperture is arranged at its different widths.

Another embodiment of the invention is a scanning probe as defined above, wherein the aperture is of non-circular shape and is variable by rotation relative to the light stripe to provide the aperture of first and second widths.

Another embodiment of the invention is a scanning apparatus as defined above, wherein the aperture is manually variable.

Another embodiment of the invention is a scanning apparatus as defined above, further comprising:

means for detecting whether the aperture is set to the first width or the second width; and means for setting the detection frame rate of the imaging sensor in dependence upon the determined width.

Another embodiment of the invention is a scanning apparatus as defined above, further comprising means for varying the aperture in response to user input instructions.

Another embodiment of the invention is a scanning apparatus as defined above, further comprising means for setting the detection frame rate of the imaging sensor in dependence upon the user input instructions.

Another embodiment of the invention is a scanning probe for capturing data from a plurality of points on the surface of an object by irradiating the object with light and detecting light reflected from the object surface, the scanning probe comprising:

(a) light generating means for generating and emitting light;

(b) an imaging sensor to detect light reflected from the object surface; and (c) data processing means operable to process signals from the imaging sensor;

wherein the data processing means is provided in a compartment separated from the light generating means and the imaging sensor.

Another embodiment of the invention is a scanning probe as defined above, wherein the imaging sensor and the data processing means are provided in a first enclosure and the light generating means is provided in a separate second enclosure, the first and second enclosures being rigidly connected together.

Another embodiment of the invention is a scanning probe as defined above, wherein the compartment of the data processing means is separated from the imaging sensor by a barrier with high thermal resistance to thermally insulate the data processing means from the imaging sensor.

Another embodiment of the invention is a scanning probe as defined above, wherein the light generating means, the imaging sensor, and the data processing means are provided in a single enclosure, and wherein the compartment of the data processing means is separated from the light generating means and the imaging sensor by a barrier with high thermal resistance to thermally insulate the data processing means from the light generating means and the imaging sensor.

Another embodiment of the invention is a scanning probe as defined above, wherein the compartment containing the data processing means has an air inlet, an air outlet, and a fan arranged to draw air into the compartment through the air inlet and to expel air from the compartment through the air outlet.

Another embodiment of he invention is a scanning probe for capturing a from a plurality of points on the surface of the object by irradiating the object with light and detecting light reflected from the object surface, the scanning probe comprising:

(a) light generating means for generating and emitting light;
(b) an imaging sensor having a plurality of pixels to detect light ref ed from the object surface through an imaging window; and
(c) a visor moveable between a closed position in which the visor covers the imaging window and an open position in which the visor does not cover the imaging window.

Another embodiment of the invention is a scanning probe as defined above, further comprising means for detecting when the visor is in the closed position and means for inhibiting operation of the probe when it is detected that the visor is in the closed position.

Another embodiment of the invention is a scanning probe as defined above, further comprising means for detecting when the visor is in the closed position and means for warning the user when it is detected that the visor is in the closed position.

Another embodiment of the invention is a scanning probe as defined above, further comprising means for locking the visor in the open position and the closed position, respectively.

BRIEF DESCRIPTION OF THE DRAWINGS

Embodiments of the present invention will now be described, by way of example only, with reference to the accompanying drawings, in which:

FIG. 3 is a diagram of a cooling system for the digital stripe scanning probe;

FIG. 4 is a schematic of the visor on the digital stripe scanning probe;

FIG. 5 is four diagrams of the stripe trimmer on the digital stripe scanning probe;

FIG. 6A is a schematic of a monkey nut shaped aperture for the stripe trimmer;

FIG. 6B is a schematic of a pair of lips shaped aperture for the stripe trimmer;

FIG. 8 is two views of a digital stripe scanning probe imaging a reflective sphere;

FIG. 11A is a diagram of the intensity $I_I$ imaged by each row over time;

FIG. 11B is a diagram of the projected intensity $I_P$ output (on a log 10 scale) by the stripe projector over time;

FIG. 12 is a method for calculating the new projected intensity for a point on a stripe;

DETAILED DESCRIPTION OF THE INVENTION

Unless defined otherwise, all technical and scientific terms used herein have the same meaning as is commonly understood by one of skill in the art. All publications referenced herein are incorporated by reference thereto. All United States patents and patent applications referenced herein are incorporated by reference herein in their entirety including the drawings.

Throughout this application, the term "about" is used to indicate that a value includes the standard deviation of error for the device or method being employed to determine the value.

The recitation of numerical ranges by endpoints includes all integer numbers and, where appropriate, fractions subsumed within that range (e.g. 1 to 5 can include 1, 2, 3, 4 when referring to, for example, a number of laser stripes, and can also include 1.5, 2, 2.75 and 3.80, when referring to, for example, measurements). The recitation of end points also includes the end point values themselves (e.g. from 1.0 to 5.0 includes both 1.0 and 5.0)

Scanning System

Figure 1:
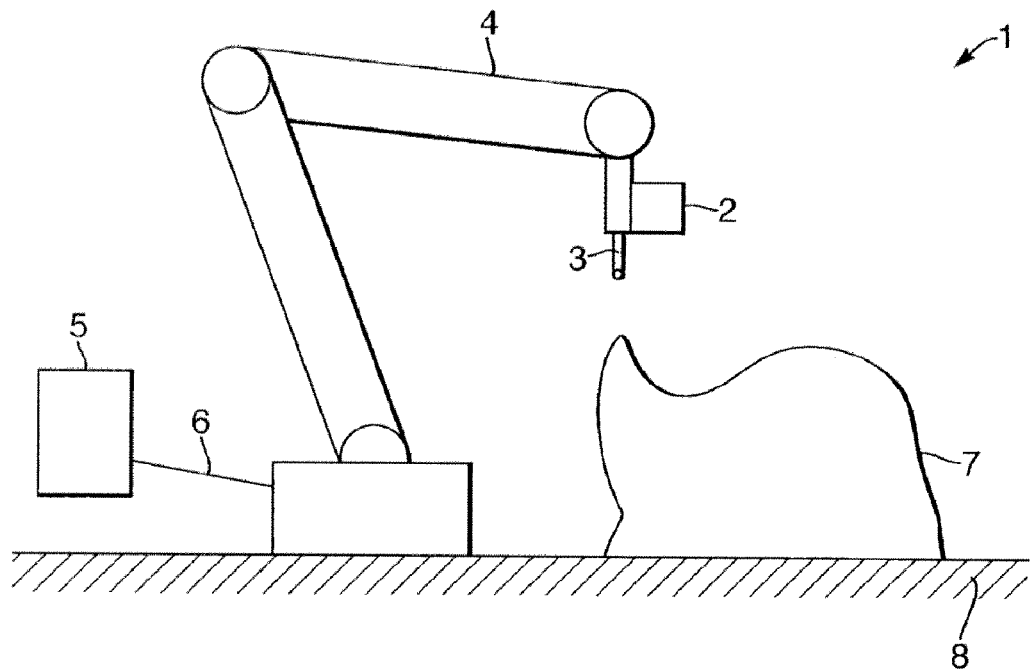
FIG. 1 is a schematic layout of a scanning system in accordance with a first embodiment of the present invention.

A first embodiment of a digital stripe scanning probe is now disclosed. The probe is "digital" in the sense that the probe comprises a process ng feature, for example, to compute the compute the intensity from one frame to another (e,g using a DSP processor or a FPGA processor) and/or to convert data recorded by the sensor into digital data FIG. 1 is a layout of a scanning system 1 in accordance with a first embodiment of the present invention. The scanning system 1 comprises a digital stripe scanning probe 2 and a contact probe 3 mounted on a localiser 4. The localiser 4 communicates with a computer 5 by means of a cable 6 or by wireless communication. The localiser 4 and an object 7 are mounted on a solid surface 8 such that there is no relative movement during scanning. It will be understood by people skilled in the art that this is an example of one such scanning system 1 that can be built using a digital stripe scanning probe 2, but that other types of scanning system with a stripe scanning probe may be employed instead.

Digital Stripe Scanning Probe

Figure 2:
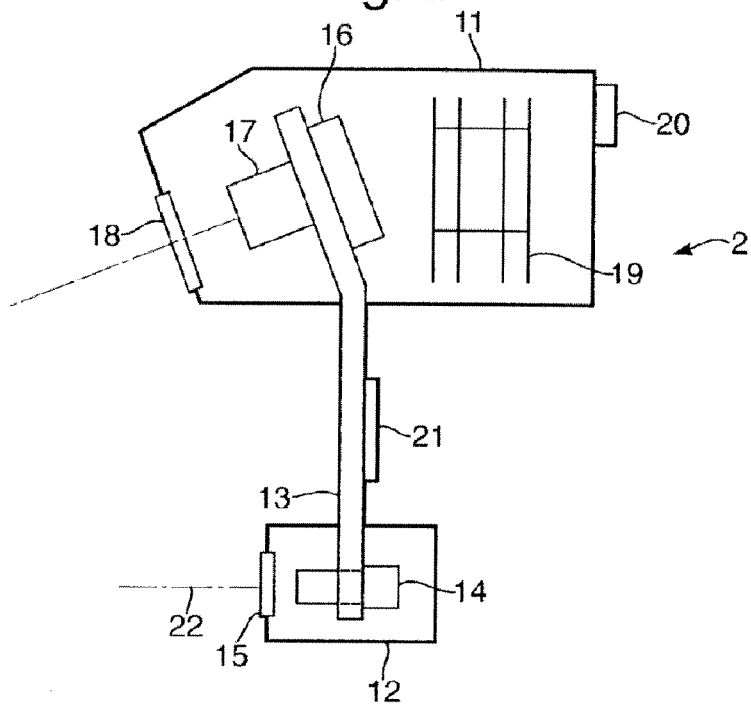
FIG. 2 is a diagram of the digital stripe scanning probe.

FIG. 2 is a diagram of the digital stripe scanning probe 2. The digital stripe scanning probe 2 comprises an imaging enclosure 11 and a stripe projector enclosure 12. The enclosures 11, 12 are mounted at either end of a rigid baseplate 13. A stripe projector 14 is mounted on one end of the rigid baseplate 13. A window 15 is provided in the stripe projector enclosure 12 for the lightpath 22 of the projected stripe to exit the stripe projector enclosure 12. A camera 16 and lens 17 are mounted on the other end of the rigid baseplate 13 from the stripe projector 14. A window 18 is provided in the imaging enclosure 11 for viewing the stripe on an object (not shown). A processing unit 19 is mounted inside the imaging enclosure 11. A mounting plate 21 is provided on the baseplate 13 for mounting the digital stripe scanning probe 2 onto a localiser 4 (not shown). A connector 20 is provided for connecting a cable to the digital stripe scanning probe 2; alternatively electrical connection could be automatically made at connector 20 when the digital stripe scanning probe 2 is mounted via mounting plate 21 onto a localiser 4.

Thermal Control

Excess heat and temperature variation can cause a digital stripe scanning probe 2 to be inaccurate due to excessive thermal growth repositioning and or reorienting the optical components relative to each other and the mount 21 resulting in the measurements becoming inaccurate. State of the art stripe scanning probes have hot computer processing equipment located well away from the probe in a separate box. The temperature increase in these 'cool' state of the art probes is small and careful thermal design has reduced thermal drift on start-up and enabled the probes to be used immediately without a warm-up period. The digital stripe scanning probe 2 has an on-board processing unit 19 and can generate more points per second than a state of the art stripe scanning probe. One reason for this is that the close proximity of the on-board processing unit 19 to the camera 16 permits data to be transferred rapidly from the camera 16 to the on-board processing unit using high bandwidth cables. Other reasons will be described below. The incorporation of the on-board processing unit 19 and the need for it to have high processing power, means that a lot of heat is generated in the digital stripe scanning probe 2. In order to maintain the accuracy of and enable immediate use of the digital stripe scanning probe 2 without a warm-up period, a novel thermal control system is provided in which the hot processing unit 19 is situated in a hot compartment that is insulated from the optical components and baseplate which remain cool.

FIG. 3 is a diagram of a cooling system for a further embodiment of the digital stripe scanning probe 2. The imaging enclosure 11 is split into a hot compartment 34 and a cool compartment 33 by a thermal barrier 32. In the hot compartment 34, a fan 31 is mounted against an outlet perforated section 36 of the imaging enclosure 11 such that hot air can be expelled by the fan 31 through the outlet perforated section 36. An inlet perforated section 37 is provided on the imaging enclosure 11 together with a dust filter 30. Cool air sucked in through the inlet perforated section 37 passes through the processing unit 19, is warmed up and exits through the outlet perforated section 36. The heat generated in the cold compartment, hot compartment and projection enclosure of the digital stripe scanning probe 2 is $H_C$, $H_L$, $H_H$ respectively. Typical values are $H_C$=0.5 W, $H_L$=0.5 W, $H_H$=3 W. In this case, approximately 75% of the heat generated in the digital stripe scanning probe 2 is $H_H$ and is generated by the processing unit 19 in the hot compartment 34. The thermal barrier 32 reduces the flow of heat $Q_B$ from the hot compartment to the cool compartment. In the cool compartment 33, the heat $H_C+Q_B$ is removed by conventional conduction, convection and radiation. In the stripe projector enclosure 12, the heat $H_L$ is removed by conventional conduction, convection and radiation. In the hot compartment 34, the net heat $H_H$. $Q_B$ is removed by conduction, radiation, convection and heat transfer $Q_A$ in which cool air passing through is warmed up. Without fan cooling, the hot compartment 34 typically operates at a temperature over 10 degrees Celsius higher than the cool compartment 33. Although the thermal barrier 32 stops much of the heat transferring from the hot compartment 34 into the cool compartment 33, the high temperature difference between the hot and cool compartments 34, 33 requires a substantial thermal barrier 32 that is wide and heavy. The main problem with an uncooled hot compartment 34 is that when the digital stripe scanning probe 2 is used in hot ambient environments such as in a desert, the processing unit 19 overheats and stops working. A through-flow, fan-driven convection cooling system is most efficient for cooling the hot compartment 34 and removes heat $Q_A$. The temperature difference between the hot and cold compartments 34, 33 is around 2 degrees Celsius with forced convection. The thermal barrier 33 is constructed using materials and methods well known to those skilled in the art. In one extreme, the hot compartment 34 may be a separate enclosure from the cold compartment 33 with ambient air free to circulate between the two compartment enclosures. A further advantage of having separate hot and cold compartments 34, 33 is that the fast-moving air caused by the fan 31, does not pass over the optical components in the cold compartment and there are no resulting thermal fluctuations that reduce measuring stability. A temperature sensing device 35 is mounted in the baseplate 13 and is used as the input for thermal calibration of the digital stripe scanning probe 2 for use in environments with ambient temperatures typically varying from 0 to 40 C. Fans can fail with hard use over long periods in harsh, dirty environments. The digital stripe scanning probe 2 of the present embodiment with separate hot and cold compartments 34, 33 can maintain its accuracy and be used without a functioning fan, in all but the hottest ambient environments.

In an alternative embodiment, the hot compartment 34 contains a fan 31 for circulating air within the hot compartment 34 which is sealed and provided with efficient cooling fins.

In an alternative embodiment, the digital stripe scanning probe 2 comprises a single enclosure within which there is a hot compartment 34 containing the processing unit 19. This embodiment is more compact than a two-enclosure embodiment. This embodiment may have a through-flow forced cooling or an internal fan to circulate the air, or no fan.

It will be understood by those skilled in the art, that other embodiments but includes all embodiments with separate hot and cold compartments are possible. For instance, the fan 31 and the filter 30 can be arranged together at the inlet with the fan sucking air in through the filter. In another embodiment, no filler is provided. In another embodiment, neither filter nor fan is provided and air naturally circulates in and out of the hot compartment through the perforations 36, 37.

Visor

Our experience with many hundreds of customers using our state of the art stripe scanning probes has shown that the main reason for any poor performance is that, despite training, the imaging window 18 becomes dirty and is not cleaned well by the user. The main source of dirt on the imaging window 18 is from dirty finger prints. For optical reasons, the imaging window 18 must be large and it is not possible to recess it sufficiently to make it physically impossible to touch.

In an alternative embodiment of this invention, a visor is provided for protecting the imaging window 18 from being touched. FIG. 4 is a schematic of the visor 41 on the digital stripe scanning probe 2. The visor 41 rotates about two pivot positions on an axis 44 in which visor protrusions fit into dimples on the imaging enclosure 11. The visor 41 can be locked in either of the Up or Down positions by means of a protrusion on the visor 45 settling into one of the two dimples 43 on the imaging enclosure 11. For non-manual applications, the visor 41 may be removed all together by pulling it away from the imaging enclosure 11. A visor detector 42 detects the presence of the visor 41 in the Down position; this information may be relayed to software that can inform the user that the visor 41 is stopping the operation of the digital stripe scanning probe 2.

The visor may be opaque or transparent.

Stripe Trimmer

When the digital stripe scanning probe 2 is being used to scan an area of detail, it is useful to be able to reduce the stripe length so as not to get excess data. State of the art scanning systems achieve a 50% reduction in stripe length using software that discards the last quarter of points at each end of the stripe. This is confusing to the operator because the operator sees a long stripe but only captures short stripe data and it is thereby difficult to use. In addition, the computer has to be used to set up this software feature.

In another embodiment of the present invention, a manually rotatable stripe trimmer with multiple positions is provided for projecting different stripe lengths so that what the operator sees whilst scanning is the data that he captures. FIG. 5 is four diagrams of the stripe trimmer 53 on the digital stripe scanning probe 2. The stripe trimmer 53 has two positions: 100% stripe length (upper two diagrams) and 50% stripe length (lower two diagrams). The stripe trimmer 53 is mounted on the front of the stripe projector enclosure 12, by means of a rotating bearing 54 and two locating dimples 56. The user manually rotates it from one position to the other. A simple mechanical blocking system in which a pin on the stripe trimmer 53 impacts one of two blocks on the stripe projector enclosure 12 prevents the operator overturning the stripe trimmer 53 in either rotational direction. An indicator mark 51 on each side of the stripe trimmer 53 aligns with either the 50% rubric or the 100% rubric on the side of stripe projector enclosure 12 so that the operator can tell at a glance which position the stripe trimmer 53 is in. The stripe 55 emerges through the rectangular aperture 57. In the 100% orientation, the stripe 55 passes through the length of the rectangular aperture 57 and is full length. In the 50% orientation, the stripe 55 passes through the width of the rectangular aperture 57 and is half length.

It will be understood by those skilled in the art, that other configurations of a stripe trimmer are possible. For instance, with the pin and blocks removed, the stripe trimmer 53 could rotate round continuously, but with 4 dimple positions at 90 deg intervals. This has the advantage of having no blocks and each quarter-turn in either direction flips the stripe length from 50% to 100% or vice versa. The aperture 57 could be another shape such as a rounded slot rather than a rectangle.

In another embodiment of the present invention, a shaped aperture is provided, allowing the user freedom to trim the stripe length between a minimum and a maximum. A good usability requirement for the shape of the aperture is to provide a constant ratio between rate of change of trimmer rotation angle and rate of change of stripe length. The resultant optimised aperture shape that can be generated by a person skilled in the art can be described as a monkey nut. A better usability requirement for the shape of the aperture is a constant ratio between rate of change of angle and rate of change of percentage stripe length. The resultant optimised aperture shape that can be generated by a person skilled in the art can be described as a pair of lips. The improved shape makes fine adjustment of a short stripe length easier, FIG. 6A is a schematic of a monkey nut shaped aperture for the stripe trimmer 53 between 50% and 100% where there is a constant ratio between rate of change of trimmer rotation angle and rate of change of stripe length. FIG. 6B is a schematic of a pair of lips shaped aperture for the stripe trimmer 53 between 50% and 100% where there is a constant ratio between rate of change of angle and rate of change of percentage stripe length. The shape of the aperture is different for different maximum/ minimum stripe length ratios. For instance, with a minimum stripe length of 25%, the waist of the monkey nut is much smaller. Dimples can be located to guide the operator to positively locate the main positions that might be used such as for stripe lengths of 25%, 50%, 75% and 100%, such that a protrusion on the stripe trimmer 53 locates in the appropriate dimple. Other aperture shapes that change the stripe length with rotation are possible. Furthermore, embodiments are not limited to a rotary means of controlling the aperture, and a linear means such as sliding a trapezoidal shaped aperture across the projected laser stripes is possible. Yet, further embodiments are not limited to manual operation, and motorised control of the aperture either manually by push buttons or automatically by a process control system is possible.

In a further embodiment, a sensor is provided to detect the position of the stripe trimmer set by the user, and a controller is provided to set the frame rate of camera 16 in dependence upon the detected position of the stripe trimmer. More particularly, the controller increases the frame rate as the length of the laser stripe decreases. This increased frame rate is possible because laser stripes of shorter length result in less pixel data to be read out and processed from the imaging sensor in camera 16. As a result, the frame rate is optimised automatically for different laser stripe lengths.

In an embodiment in which the stripe trimmer is adjusted automatically (rather than manually) in accordance with user input instructions defining a required laser stripe length, the controller may be arranged to set the frame rate in dependence upon the user instructions, thereby attaining the same advantages as those described above.

Digital Stripe Scanning Probe Electronics

Figure 7:
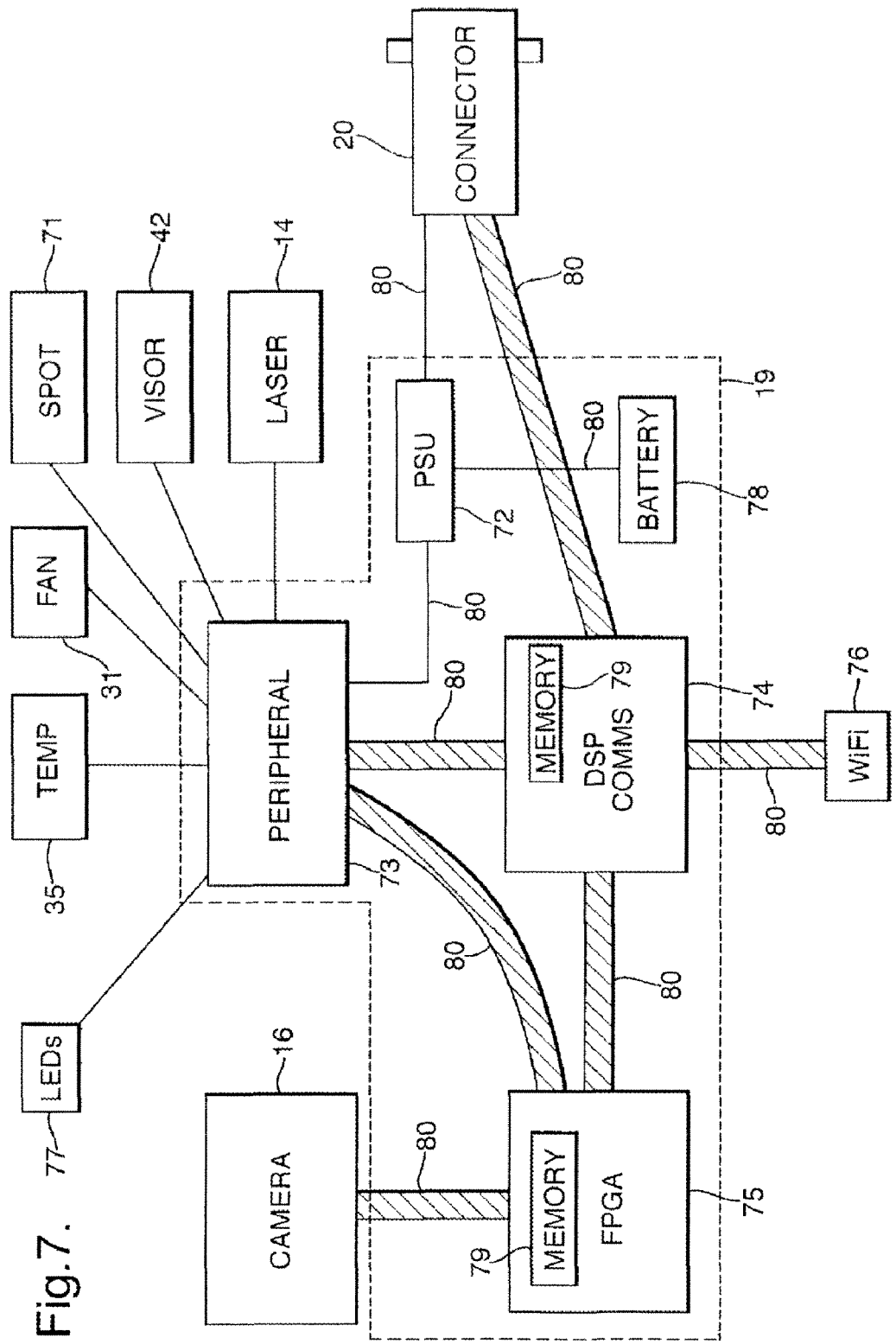
FIG. 7 is a diagram of the electronics in the digital stripe scanning probe.

FIG. 7 is a diagram of one embodiment of the electronics in the digital stripe scanning probe 2. The processing unit 19 comprises four module PCBs: an FPGA module 75, a DSP module 74 for communications, a peripheral interconnection module 73 and a power supply module 72. The four modules are interconnected with power/data buses 80. The camera 16 is connected to the FPGA module 75. The peripheral interconnection module 73 connects to the temperature sensor 35, the fan 31, the rangefinder laser spot 71, status LEDs 77, the visor detector 42 and the stripe projector 14. The DSP module 74 for communications links to a WiFi module 76. A battery 78 is provided. The probe connector 20 links to the power/ data buses 80. Circuitry in the PSU module 72 is provided for recharging the battery 78. Memory 79 is provided on the FPGA module 75 and the DSP module 74. The memory 79 is both static and dynamic. The static memory 79 is used for storing identification, calibration, settings and other information such as usage history to aid maintenance. The settings in the static memory 79 may be changed by means of sending signals to the digital stripe scanning probe 2 over the communications bus. At least one accurate clock is provided for the purpose of time stamping synchronisation.

It will be understood by those skilled in the art that other embodiments of the electronics in the digital stripe scanning probe 2 are possible. For instance, any or all of the modules in the processing unit 19 may be physically combined into a single module to suit packaging requirements. Any of the items 31, 35, 14, 77, 42, 71, 76 can be connected to or incorporated in any of the modules in the processing unit 19. One or more chips can be combined into one chip. The power/ data buses 80 may be configured in different arrangements to suit design requirements. The battery 78 may be permanent, rechargeable or replaceable.

Cabling and Wireless

The scanning system of FIG. 1 has four main connection/communication requirements:
- power/ground from localiser or computer to probe
- data communications between localiser and computer
- synchronisation between probe and localiser
- data communication between probe and computer.

A person skilled in the art may solve these connection/communication requirements using any effective combination of cables and wireless. Users prefer fewer cables.

In the present embodiment, the probe, computer and localiser can share a common data bus such as Ethernet or Wifi. This reduces the cabling requirements. The use of a bus generally available on computers such as Ethernet, Wifi, USB or Firewire also removes the cost of purchasing a special PC card for a dedicated bus. Alternatively or in addition, data may be transferred between the probe and computer using a serial digital interface (SDI) which digital interface is well known in the art.

Furthermore, in the present embodiment, a digital stripe scanning probe 2 can be used without cable attachment to a localiser 4. A cable for power and ground is not required during use of the digital stripe scanning probe 2 due to the battery 78 built into it. However, the battery 78 will need replacing or recharging by cable. Data communications can be carried out with standard high bandwidth radio communication buses such as Wi-Fi. Where accurate clocks are present in both localiser 4 and digital stripe scanning probe 2, then radio synchronisation can be used periodically to check/adjust the two clocks. In between these clock checks, both localiser 4 and digital stripe scanning probe 2 can timestamp each of their data packets and the data streams can be merged in downstream software.

Synchronisation

The digital stripe scanning probe 2 can be synchronised in more than one way without any change required to the hardware or firmware of the digital stripe scanning probe 2. Localisers 4 operate in various ways. Different types of synchronisation are required for different localisers 4. Synchronisation of the digital stripe scanning probe 2 with the localiser 4 is important for accuracy. The digital stripe scanning probe 2 has provision for generating and receiving different types of synchronisation signal in which the digital stripe scanning probe 2 can be either master, or slave to the localiser 4, or slave to a master clock. Synchronisation signals include plain trigger signals and coded signals. Synchronisation signals can be real-time, pre-synchronised or post-synchronised. Pre- and post-synchronisation can make use of time stamping. Codes sent with a synchronisation signal can be quasi-unique identification codes and/or time stamp information. A small number of types of synchronisation are sufficient to cover nearly all localiser-probe synchronisation requirements. Different types of synchronisation are provided in the digital stripe scanning probe 2. The operator sets the type of synchronisation to be used with a localiser by changing a setting in the digital stripe scanning probe 2. Embodiments are not limited to the types of synchronisation disclosed herein, and any form of synchronisation of digital stripe scanning probe 2 and localiser 4 is possible.

In the present embodiment, synchronisation is plug and play. A plug and play protocol/format is defined that covers a set of types of synchronisation. On being connected to a localiser 4, the digital stripe scanning probe 2 and the localiser 4 automatically negotiate a synchronisation type. Plug and play has the advantage of not needing to have the operator set up each unit (localiser and digital stripe scanning probe) manually with specific synchronisation settings. A person skilled in the art may define the set of types of synchronisation to be used and the protocol/format.

Light Levels

The projected intensity of the laser stripe 55 for optimum incoming light level into the camera 16 varies by several orders of magnitude depending on factors including: surface colour, surface reflectivity, standoff distance from the digital stripe scanning probe 2 to the surface of the object 7, surface normal relative to laser stripe projector 14, surface normal relative to camera 16, position of a point along the stripe and specular reflection. High projected intensity is required when the surface colour is dark and reflective, it is the end of the stripe, the surface normal points significantly away from both the camera 16 and the laser stripe projector 14 and there is a large standoff. Under these conditions very little of the projected laser power scatters back into the camera 16. Low projected intensity is required in the middle of a stripe on a mirror surface at the specular angle and low standoff. Under these conditions virtually all the laser power is reflected straight back into the camera 16. Typical differences in optimum projected laser intensity span a range of 100,000:1. An average CCD camera with a fixed setup can rarely produce quality scan data with a range of 1,000:1 in light level along the stripe. To achieve the best data quality when scanning, it is ideal to optimise the projected laser intensity for each point along the stripe. In state of the art stripe scanning probes with a static laser stripe, the whole stripe is imaged by a CCD camera at the same time.

U.S. Pat. No. 5,193,120 (Gamache et al.) and JP2000-097629 (Mishitoshi et al.) disclose scanners comprising a CCD and a laser stripe generated with a cylindrical lens. A calculation engine is used to control the amount of light received depending on the light received in an earlier frame. The control consists in adjusting the exposure time of the CCD, the laser power, etc. Because of the properties of the CCD, the entire frame is captured at once. Furthermore, when using a cylindrical lens, the laser beam is split in a stripe and all points of the stripe have the same intensity. Therefore, with the configuration proposed by Gamache and Mishitoshi, it is not possible to vary or control the imaged intensity within a frame.

State of the art stripe scanning probes work well on matte white surfaces because the variation in incoming light levels along the stripe vary by well under 1000:1. State of the art stripe scanning probes fail when scanning objects such as reflective spheres; failure is at both extremes: too much incoming light in areas of specular reflection and too little incoming light at the ends of the stripe.

One embodiment of the present invention relates to a scanning probe 2 for capturing data from a plurality of points on the surface of an object by irradiating the object with a light stripe and detecting light reflected from the object surface, the scanning probe comprising:
(a) stripe generating means 14 for generating and emitting a light stripe 55;
(b) a camera 16 comprising an imaging sensor having an array of pixels to detect the light stripe reflected from the object surface;
(c) means for adjusting the intensity of the light stripe 55 during acquisition of a frame, in dependence upon the intensities detected by the camera 16.

Adjustment to the intensity of the light stripe is performed during acquisition of a single frame, based on intensities detected by the camera while the frame is still being acquired. The invention achieves this by, for example, using a roller shutter which sequentially scans the surface of a 2D sensor; the adjustment is achieved using one or more intensities registered during a previous part of the rolling shutter scan. Alternatively or in addition, this is achieved using a stripe comprising individual spots that are rapidly and separately projected over the object. The spots effectively illuminate a portion of the object at a time, scanning the object sequentially; the adjustment is achieved using intensities registered during a previous part of the scan.

In both alternatives, different subsets of the imaging sensor pixels at different times detect light reflected from the stripe during the acquisition of a frame, the different subsets corresponding to different positions on the detected light stripe. Preferably the different positions are adjacent. The intensity of the light is adjusted during acquisition of the frame, in dependence upon the intensities detected by the subset of pixels. Particular embodiments of the invention using a CMOS camera, a CCD camera, static and moving optics are described below.

Stripe Imaging using a CMOS Camera and Rolling Shutter

According to one embodiment of the invention, a camera 16 is one provided with a rolling shutter and the laser intensity is controlled such that the laser intensity for the stripe or each point in the stripe and the scan data is of optimum quality for any given captured frame. The laser stripe projector 14 may use static optics (e.g. solid cylindrical optics or a solid state micro-mirror array) for generating the stripe from a laser diode and lens. Alternatively, the laser stripe projector 14 may use moving optics (e.g. moving mirror) which are mechanically driven.

Using a solid cylindrical optics, a laser of constant or variable intensity is projected through the optics resulting in a laser stripe 55 having an essentially unvariable intensity across the length of the stripe, which intensity can be increased or decreased across the length of the stripe.

With a micro-mirror array, a laser of constant or variable intensity is projected onto the micro-mirror array. The stripe is essentially a plurality of spots. One or more spots can scan the object very rapidly (e.g. 500, 60, 700, 800, 900, 1000 or more Hz) giving the appearance of a continuous stripe. The resulting laser stripe 55 is formed from a plurality of points whose intensities can individually be controlled. The laser stripe 55 is generated by controlling the orientation of the micro-mirrors. The result can be a stripe 55 with unvariable intensity across the length of the stripe, as achieved using solid cylindrical optics. Alternatively, the result can be a stripe with variable intensity across the length of the stripe. For example, the micro-mirrors generating a first half of the stripe may spend two thirds of the time reflecting laser light towards the stripe, while the micro-mirrors generating the second half of the stripe may spend one third of the time reflecting laser light towards the stripe. In this example, the first half of the sensor would receive twice as much intensity than the second half. Micro-mirror arrays are known in art, for example, the DLP system produced by Texas Instruments (www.dlp.com).

With a moving mirror array, the resulting laser stripe 55 is formed from a plurality of spots whose intensities can individually be controlled. One or more spots can scan the object very rapidly (e.g. 500, 60, 700, 800, 900, 1000 or more Hz) giving the appearance of a continuous stripe. The result may be a stripe 55 with unvariable intensity across the length of the stripe, as achieved using solid cylindrical optics. Alternatively, the result can be a stripe with variable intensity across the length of the stripe as achievable using a micro-mirror array. The mirror is typically a rotating polygon mirror or an oscillating galvanometer mirror that generates a flying spot that is synchronised with the laser power for each point along the projected stripe. A telecentric lens may be needed to enable synchronised operation at near and far standoffs. The angular velocity of the rotating mirror requires precise control and synchronisation which can be provided by a person skilled in the art.

The laser stripe 55 is static and does not move relative to the baseplate 13. The projected intensity of the laser stripe 55 may be controlled by controlling the power to the laser diode in the laser stripe projector 14 (for solid cylindrical optics or moving optics) and/or by controlling the micro-mirror array where present to project more or less intense light. The adjustment to the laser diode will be up to a maximum power consistent with an acceptable lifetime for the digital stripe scanning probe 2. In addition, the laser diode power can be switched on and off and strobed at a high frequency. The high frequency of the laser power strobing must be much greater than the exposure time of a pixel on the imaging sensor in the camera 16 so as to project very low laser powers without causing timing problems. The imaging sensor in the camera 16 has an optimum incoming light level for the laser light coming into the camera 16 for a particular set of camera and image processing operating parameters (exposure, aperture, sensitivity, threshold). FIG. 8 is two views of a digital stripe scanning probe 2 imaging an object 7 that is a reflective sphere. The stripe 55 is projected by the stripe projector 14 and imaged by the camera 16. The left hand view is a side view. The right hand view is a front view. The centre 'S' of the stripe 55 is specularly reflecting into the camera 16.

Figure 9A:
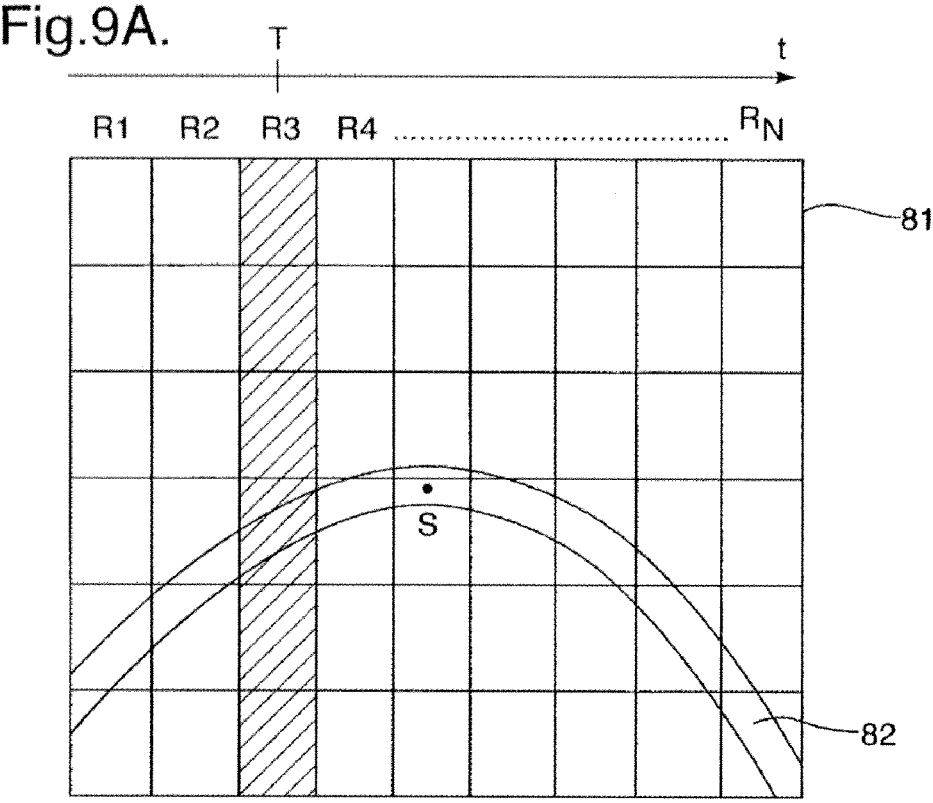
FIG. 9A is a diagram of the stripe image on the imaging sensor when a roller shutter is employed.

FIG. 9A is a diagram of the stripe image 82 of the stripe 55 on the imaging sensor 81. The curve of the stripe 55 on the spherical object 7 is imaged as a curve on the stripe image 82. The imaging sensor 81 is a CMOS sensor with rolling shutter. Imaging sensor chips 81 can he bought from a variety of manufacturers including Cypress Semiconductor Corporation (USA) who make the IBIS 5A-1300 CMOS imaging sensor. The Imaging sensor 81 is a 2D array of pixels and has a number of rows $R_1 \ldots R_N$ that is typically 1000 or more rows. The imaging sensor 81 is configured to have a rolling shutter which sweeps across the sensor, exposing rows of pixels sequentially during the acquisition of a frame. At any given time during acquisition of a single frame, a number (a subset) of pixels collect light whilst the rest of the pixels do not collect light. The full sweep of rolling shutter leads additively to exposure of essentially the entire imaging sensor array, during the acquisition period.

A CMOS comprises a 2D array of light sensitive pixels which are capable of capturing an image. Each pixel performs its own A/D conversion within the CMOS, thus the output from a CMOS is digital, and there is no need to digitise the frame using a frame grabber. Furthermore, each pixel can be accessed individually to determine the intensity of light falling thereon. For this reason, a CMOS is also called an "addressable camera". A CMOS can to used in a rolling shutter mode. The addressability allows flexibility in the integration time for each pixel; it need not be the same for all pixels. For example, the first half of a stripe may be integrated between t=0 and t=5 s, and the second half between t=5 and t=10 s.

The shutter rolls in effect from row $R_1$ to row $R_n$. Row $R_3$ is shaded to indicate that at time T, now $R_3$ is collecting light whilst all the other rows are not collecting light. In state of the art stripe scanning probes, imaging sensors that typically have more columns than rows, are usually positioned in a landscape format so that the stripe is imaged over the maximum number of columns providing more points along a stripe for a given sensor. In the digital stripe scanning probe 2, the imaging sensor 81 has been rotated 90 degrees to take advantage of the rolling shutter; the rows and columns are thereby interchanged in the present figure.

Figure 9B:
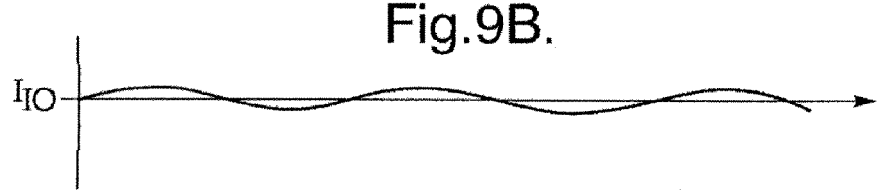
FIG. 9B is a diagram of the intensity $I_I$ imaged by each row over time when a roller shutter is employed.
Figure 9C:
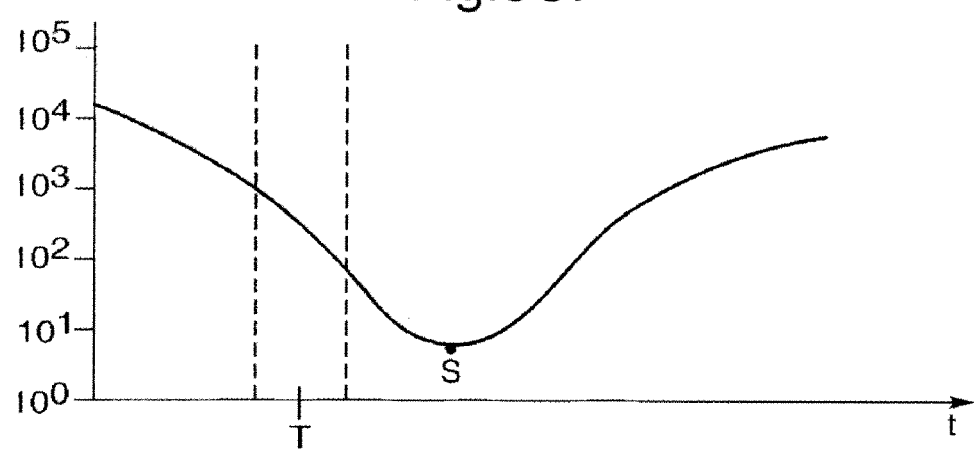
FIG. 9C is a diagram of the projected intensity $I_P$ output (on a log 10 scale) by the stripe projector over time when a roller shutter is employed.

FIG. 9B is a diagram of the intensity $I_I$ imaged by each row over time t, compared to the optimum imaged intensity $I_{IO}$ for the imaging sensor 81. The stripe will image over several columns and the imaged intensity $I_I$ is the area under the curve when calculating the column centroid of a row. The optimum imaged intensity $I_{IO}$ is an intensity set by a skilled person adjusting laser power control parameters such that no pixel is flooded with too much light and the average signal in each pixel is well above the background noise that is removed by thresholding during image processing. The imaged intensity $I_I$ is close to the optimum imaged intensity $I_{IO}$ along the imaged stripe 82. FIG. 9C is a diagram of the projected intensity $I_P$ output (on a log 10 scale) by the stripe projector 14 over time t. The projected intensity $I_P$ at each point on the stripe 55 is the projected intensity $I_P$ that results in an imaged intensity $I_I$ for that point, that is as close as possible to the optimum imaged intensity $I_{IO}$. At point S, the projected intensity $I_P$ is small because at point S there is specular reflection of the projected intensity back into the camera 16. At either end of the stripe 55, such as row $R_1$, the projected intensity $I_P$ is large because most of the projected light is scattered away from camera 16 and only a small proportion of the light travels to the image sensor 81.

The projected stripe 55 may have unvariable intensity across its length whereby an adjustment to the laser intensity will be evidenced across the stripe. Where the projected stripe 55 is generated using a micro-mirror or moving optics, the intensity within the stripe may also be adjusted as the stripe is effectively a series of individually projected spots. The projection of the spots can be synchronised with the rolling shutter such that adjustment of intensity can be applied to a part of the stripe 55 during the acquisition of a frame, with the effect that each frame captured by the CMOS is optimised.

Stripe Imaging Using a CCD Camera

According to another embodiment, the camera 16 is a CCD camera having a 2D array of sensors, and the laser stripe projector 14 is one that uses a moving mirror or a micro-mirror array in combination with a laser diode and lens. The moving mirror and the micro-mirror array are described above.

The resulting laser stripe 55 is static relative to the baseplate 13, but is formed from a plurality of points whose intensities can individually be controlled such that the laser intensity for each point in the stripe and the scan data is of optimum quality for any given frame.

The projected intensity within the laser stripe 55 is controlled by controlling the power to the laser diode and/or by controlling the micro-mirror array where present to project more or less intense light. The adjustment to the laser diode will be up to a maximum power consistent with an acceptable lifetime for the digital stripe scanning probe 2. In addition, the laser diode power can be switched on and off and strobed at a high frequency. The high frequency of the laser power strobing must be much greater than the time it takes for the mirror to sweep the stripe, and also much greater than the exposure time of a pixel on the CCD sensor in the camera 16 so as to project very low laser powers without causing timing problems. The CCD sensor in the camera 16 has an optimum incoming light level for the laser light coming into the camera 16 for a particular set of camera and image processing operating parameters (exposure, aperture, sensitivity, threshold).

FIG. 8 as described above applies to this embodiment and to the following description. FIG. 10F is a diagram of the stripe image 131 of the stripe 55 (FIG. 8) on the imaging sensor 132. The stripe image 131 represents a captured frame. The curve of the stripe 55 on the spherical object 7 is imaged as a curve on the imaging sensor 131. The imaging sensor 132 may be a CCD which can capture the intensity and position of light reflected from the object. The imaging sensor 132 is typically a 2D array of pixels and has a number of rows $R_1, \ldots R_N$ that is generally 1000 or more rows. Detection of an over- or under-saturated sensor in the array leads to a compensatory adjustment in laser intensity. The projected stripe 55 is effectively a series of spots projected from the laser by the sweep of a moving mirror. Adjustment of intensity can be applied to a part of the stripe 55 during the acquisition of a frame, with the effect that each frame captured by the CCD is optimised.

Figure 10A:
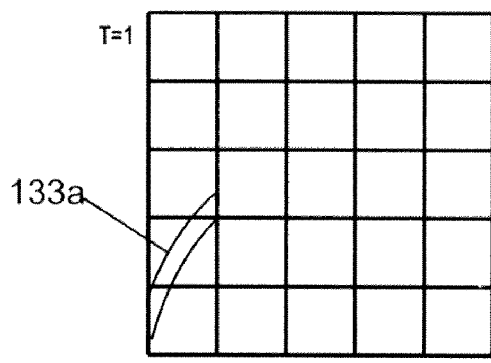
FIG. 10A to 10E are diagrams of incomplete stripe image patterns on the imaging sensor when a moving mirror or micro-mirror array is employed.
Figure 10B:
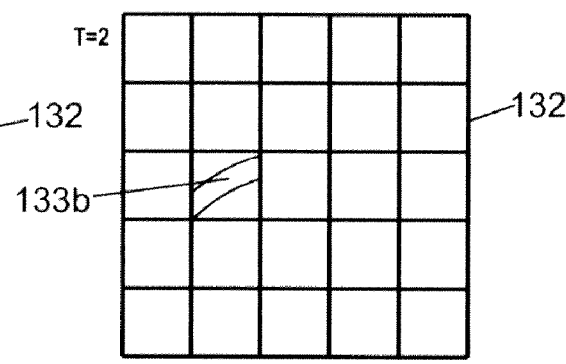
Figure 10C:
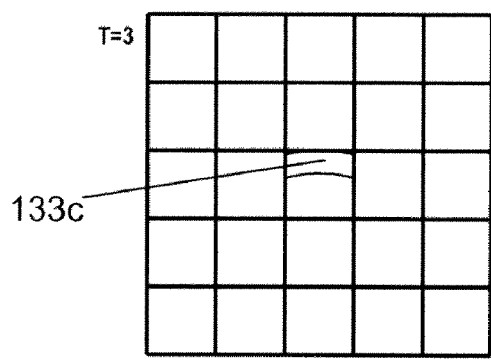
Figure 10D:
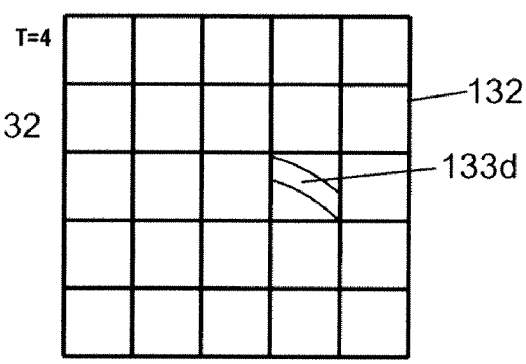
Figure 10E:
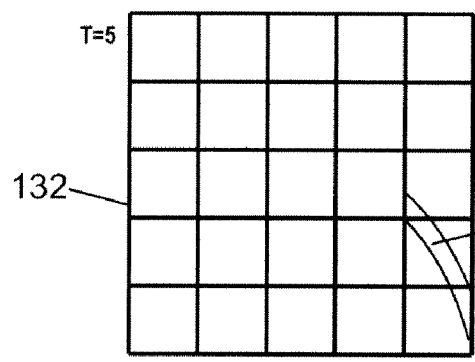
Figure 10F:
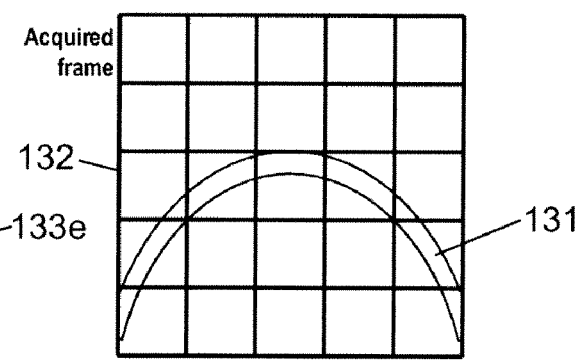
FIG. 10F is a diagram of the acquired stripe image on the imaging sensor.

FIGS. 10A to E show the incomplete patterns (133a to 133e) of the stripe image 131 detected by the CCD 132 during acquisition of a complete frame at time intervals T=1 to T=5. At the first time interval T=1 (FIG. 10A), the image intensity of the incomplete pattern 133a is integrated, and result used to adjust the power output of the laser in detection of the pattern 133b during the next time interval T=2 (FIG. 10B). The cycle is repeated for subsequent patterns (113c to 113e), until the length of the laser stripe 55 has been detected by the CCD sensor 132. At the end of the detection period (T=1 to T=5), the image of the acquired frame has been optimised.

FIG. 11A is a diagram of the imaged intensity $I_I$ of each incomplete pattern obtained by integration of the intensity during each time periods T1 to T5, together with the optimum imaged intensity $I_{IO}$ for the imaging sensor 132. The optimum imaged intensity $I_{IO}$ is an intensity set by a skilled person adjusting laser power control parameters such that no pixel in the CCD is flooded with too much light and the average signal in each pixel is well above the background noise that is removed by thresholding during image processing.

The imaged intensity $I_I$ is close to the optimum imaged intensity $I_{IO}$ along the imaged stripe 132. FIG. 11B is a diagram of the projected intensity $I_P$ output (on a log 10 scale) by the stripe projector 14 over time t. The projected intensity $I_P$ at each point on the stripe 55 is the projected intensity $I_P$ that results in an imaged intensity $I_I$ for that point, that is as close as possible to the optimum imaged intensity $I_{IO}$. At point S, the projected intensity $I_P$ is small because at point S there is specular reflection of the projected intensity back into the camera 16. At either end of the stripe 55, such as now $R_1$, the projected intensity $I_P$ is large because most of the projected light is scattered away from camera 16 and only a small proportion of the light travels to the image sensor 132.

Projected Intensity Control

The DSP processor in the module 74, executes a stripe intensity projection firmware procedure for taking a previously generated set of projected intensities with one projected intensity for each point along a stripe and outputting corresponding laser power values to the laser power circuitry on the peripheral module 73. The laser power values are output in synchronisation with the timing of the rolling shutter on the imaging sensor 81 or movement of the mirror/micro-mirror such that the laser power corresponding to the required projected intensity for a point on the stripe is provided. In the case of a roller shutter system, the projected intensity is provided whilst the corresponding row on the imaging sensor 81 has the shutter open. In the case of a moving mirror system, the projected intensity is provided synchronised to the position of the mirror and projected spot. In the case of a micro-mirror system, the projected intensity is provided synchronised to the mirror-vibration frequencies and projected spots. It is a simple matter for persons skilled in electronics and processor software to implement circuitry and a firmware procedure to achieve these functions.

Adaptive Stripe Intensity Control Method

According to one embodiment of the invention, the ideal projected intensity of the laser for each point along the next stripe is estimated by using the imaged intensity for each point in one or more previous stripes and the known projected intensities of the laser for each point in the one or more previous stripes and iterating to a new estimate.

According to another embodiment of the invention, the ideal projected intensity within a stripe, for the next point along the stripe is estimated by using the imaged intensity for one or more previous points within a stripe and the known projected intensities for one or more previous points within the stripe and iterating to a new estimate.

FIG. 12 is a method for calculating the new projected intensity for a point on a stripe. In Step 91, one or more imaged intensities are received for the same point on one or more previous stripes, or for one or more previous points within the same stripe. In Step 92, one or more projected intensities are received for the same point on one or more previous stripes, or for projected intensities are received for one or more previous points within the same stripe. The received projected intensities are the values used by the DSP processor in the module 74 for controlling the laser power in previous stripes or points. In Step 93, a new projected intensity is calculated for the same point in the next stripe, or for a next point in the same stripe.

Intensity Algorithm

Figure 14:
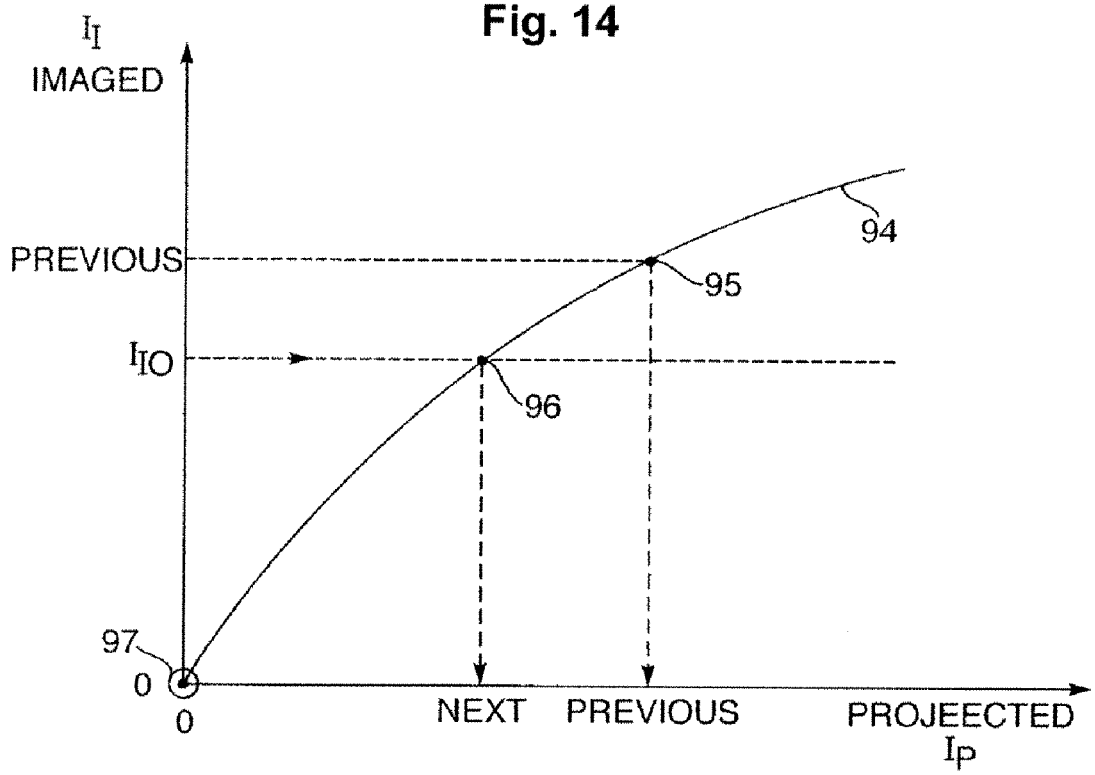
FIG. 14 is a diagram for a relationship between the imaged intensity $I_I$ and the projected intensity $I_P$.

A simple algorithm for calculating the new projected intensity is based on the previous imaged intensity for a point and the previous projected intensity for the same paint. The relationship between previous imaged intensity and previous projected intensity is different for each design of digital stripe scanning probe 2 and is usually non-linear. An elliptical relationship has been found to be a good starting approximation, but parabolic or other relationships based on equations can be better. A single relationship can generally be used for all points in all rows. Each point has an unknown and usually changing light reflectance ratio. The previous coordinate for that light reflectance ratio is known: previous imaged intensity, previous projected intensity. The relationship is scaled using two coordinates: (previous imaged intensity, previous projected intensity) and the (0,0) point where both imaged and projected intensities are zero. The relationship can be expressed as an equation or embedded in a look-up table. FIG. 14 is a diagram for a relationship 94 between the imaged intensity $I_I$ and the projected intensity $I_P$. The relationship 94 is scaled to fit between the zero point 97 and the coordinate 95 of the previous imaged intensity and previous projected intensity. The scaled relationship is based on the measured light reflectance ratio from the previous point. The next projected intensity is calculated from the optimum imaged intensity $I_{IO}$ and the relationship 94 via coordinate 96. The optimum imaged intensity $I_{IO}$ can be substantially larger or smaller than the previous imaged intensity.

It will be appreciated by those skilled in the art, that a number of different methods can be used for generating the new projected intensity for a point. It will also be appreciated that a number of modifications will be obvious to those skilled in the art. The disclosed calculation of the next projected intensity assumes an unchanging light reflectance ratio; this is a best estimate, since the light reflectance ratio is likely to have changed by a small amount as the laser stripe 55 moves relative to the surface of the object 7. Interpolation methods may be used where several previous projected and imaged intensities are processed. Smoothing methods may be used as a post process taking into account neighbouring next projected intensities.

Rolling Shutter Multi-Row Exposure

There are many different types and configurations for a rolling shutter. The exposure time is fixed for each frame. In general, a rolling shutter starts with the first pixel on row 1 and ends with the last pixel on the last row before continuing again at the first pixel on row 1, possibly with a different exposure time. Each pixel is open to receive light for a certain amount of time: the exposure time. The length of exposure time of the rolling shutter depends on the imaging sensor, its setup and the laser power. At 100 frames per second and 1000 rows, an exposure of 0.1 msec will cover 10 rows. This means that 10 rows will be imaging light at any time. The ideal situation is then to reduce the exposure to 0.01 msec, but at such a short time, not enough light will be imaged. The laser intensity could be increased, but safety regulations for operator use of laser stripes limit this intensity. In practice, under different conditions, from 1 to 100 rows out of 1000 rows will be imaging light at any time. The disclosed adaptive stripe intensity control method is modified. The projected intensity for a point is now calculated as the average of all the projected intensities that were projected whilst the aperture was open on the row corresponding to that point. It will be appreciated by those skilled in the art, that a number of different methods and optimisations can be used for generating the new projected intensity for a point where multiple rows are simultaneously exposed.

In the present embodiment, the exposure time is modified from one frame to the next, if there is a benefit to be gained in data quality by increasing or decreasing the exposure time. Where it is difficult to reach the optimum imaging intensity of parts of a stripe with the laser power at the maximum permissible power, then the exposure time is increased. Where the laser power is low for the whole frame, the exposure time is reduced in order to reduce the number of rows exposed simultaneously. A reduction in the number of rows exposed simultaneously increases the sharpness of response to any rapid changes in light reflection of the surface and optimises data quality.

Labelling Data Quality

The present embodiment is adaptive to rapid changes in surface texture and shape as the digital stripe scanning probe 2 moves over the surface of the object 7. The reaction time to rapid changes is typically one stripe which on a system running at 200 stripes per second is equal to 5 msecs. It is likely that where there are rapid changes, the data quality will be worse during the change. In calculating the imaged intensity for each point, it is possible to give an indication of data quality. In the simplest form, data that does not pass a quality threshold, can simply be destroyed prior to data output to the application software. For some applications, a label can be attached to each sub-standard data point giving the degree of quality. A label of one byte in size could label quality from 0 (poor) to 255 (excellent).

Scanned Stripe

In an alternative embodiment, a laser stripe is created by scanning a laser spot using a rotating polygon mirror or an oscillating galvanometer mirror. The flying spot is synchronised with the rolling shutter and the laser power is set for each point along the projected stripe. A telecentric lens is needed to enable synchronised operation at near and far standoffs. The angular velocity of the rotating mirror requires precise control and synchronisation which can be provided by a person skilled in the art.

Tracking Window

Figure 13:
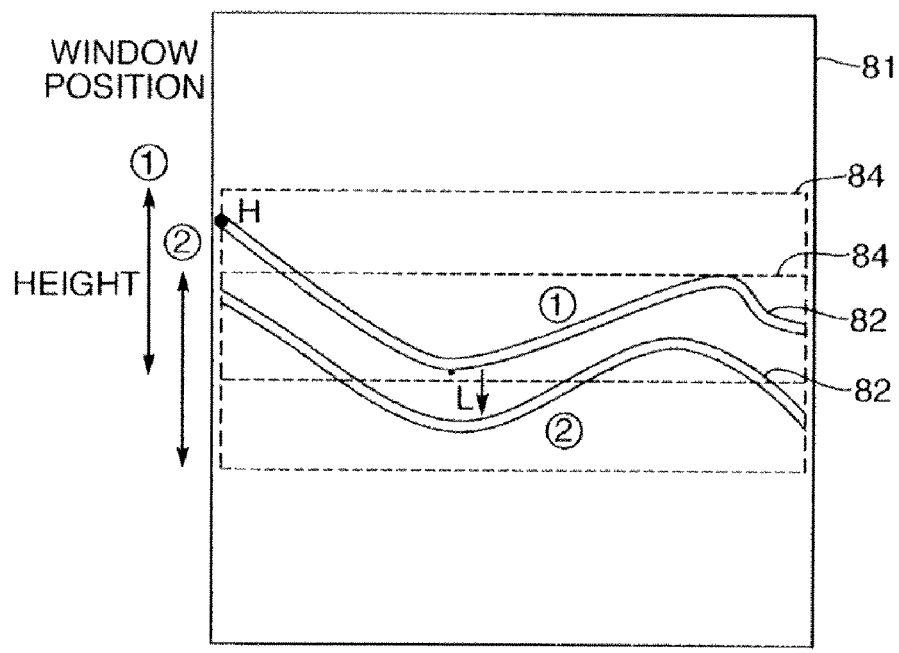
FIG. 13 is a schematic of a stripe image within a tracking window.

The present embodiment increases the speed in stripes per second of the digital stripe scanning probe 2 by using a tracking rectangular window in which the stripe is present rather than a full frame. FIG. 13 is a schematic of a stripe image 82 moving down an imaging sensor 81 within a tracking window 84. The tracking window 84 is always the full width of the imaging sensor 81. The tracking window 84 moves up and down tracking the stripe. The depth of the tracking window 84 can increase and decrease as the shape of the stripe image 82 changes. The tracking window 84 is larger than the rectangular area occupied by the stripe image 82; this extra window area enables the stripe to move significantly between frames and still be captured. The extra window area is typically 10% of the height of the imaging sensor 81 at the top and at the bottom. There is a minimum height of tracking window 84, which is typically 25% of the height of the imaging sensor 81 array. For the first frame of a scan, the window is the size of the whole frame. In following frames, the window shrinks down around the stripe image 82. When a frame is processed. L the lowest point on the stripe image 82 and H the highest point on the stripe image 82 are calculated. The window size for a following frame is given as from H+0.1F to L−0.1F where F is the number of columns in the imaging sensor 81. The latency on the tracking can be restricted by the design of the imaging sensor 81 and the camera 16.

The advantage of using a tracking window is that it is not necessary to read out (or process) the data from the parts of the sensor which are outside the tracking window, resulting in significant time savings. Moreover, because of these time savings, more points per second may be acquired by the scanner. This is because the faster processing of data from one frame allows more frames per second to be captured and processed. This higher sampling results in better accuracy in point location (for example, the same point may be acquired several times and averaged). Storage requirements are also reduced because less data is read out and stored from the sensor. With a CMOS, the tracking can be set electronically as only a part of the frame is effectively read. With a CCD, as the entire frame is read, the tracking provides benefits during the computation as there is less data to process.

The scanner may be arranged so that the pixels outside the tracking window do not accumulate charge during the integration time of the sensor. Alternatively, the scanner may be arranged so that all pixels accumulate charge. In the latter case, the charge for the pixels outside the tracking window is not read out, but is reset before the next sensor integration period.

The rolling shutter described above operates within the tracking window.

Sensors

In the embodiments described above, the scanning probe has an imaging sensor comprising a CMOS sensor and a rolling shutter, or comprising a CCD.

The CMOS is suitable for rolling shutter applications because each pixel can be individually addressed. A CMOS is also called an "addressable camera". Furthermore, in a CMOS, each pixel performs its own A/D conversion. Also, using a rolling shutter, the integration time need not be the same for all pixels: for example, the first halt is integrated between t=0 s and t=5 s, and the second half between t=5 s and t=10 s. However, for the rolling shutter application, any type of addressable imaging sensor may be used, that is any type of sensor which permits selective read out of data from a predetermined region of the sensor without having to read out data from the other regions in the sensor. For example, certain types of CCD are addressable because they permit data to be read out from selected rows or columns of pixels, and these CCDs may be used in embodiments.

The individual pixels of a CCD are not addressable, therefore, the present invention employs the combination with a variable intensity stripe or achieve an optimised frame. In a CCD the light is integrated in each pixel during a common period of time (exposure time): say from 0 to 10 s. At the end of the integration, the entire analog signal is transferred to a frame grabber to be digitalized.

Laser Modifications

In the embodiments described above, the stripe projector 14 of the scanning probe employs a laser to irradiate the object surface* The laser may emit light in any part of the electromagnetic spectrum such as the visible, infrared, etc. Furthermore, alternatives such as a white light source may be used instead of a laser.

Other Modifications

In the embodiments described above, a single stripe projector 14 and a single camera 16 are used. However multiple cameras may be used in conjunction with a single stripe projector. Alternatively, multiple cameras may be used with multiple stripe projectors—for example, each stripe projector may project stripes at different orientations and each camera may detect a respective stripe.

In the embodiments described above, the scanning probe is moved relative to the object to scan the object, and a localiser is used to determine the position of the scanning probe. However, instead, the scanning probe may be maintained in a stationary position and the object moved to known positions relative to the stationary probe. For example, the position of the object may be determined using one of the localisers described above.

The invention claimed is:

1. A scanning probe for capturing data from a plurality of points on a surface of an object by irradiating the object with a light stripe and detecting light reflected from the object surface, the scanning probe comprising:
   (a) a stripe generator for generating a light stripe;
   (b) an imaging sensor to detect the light stripe reflected from the object surface; and
   (c) an aperture through which the light stripe generated by the stripe generator is emitted, the aperture being variable to provide an aperture of a first width and an aperture of a second width through which the light stripe passes such that light stripes of different lengths are generated when the aperture is arranged at different widths.

2. A scanning probe according to claim 1, wherein the aperture is of non-circular shape and is variable by rotation relative to the light stripe to provide the apertures with the first and second widths.

3. A scanning probe according to claim 1, wherein the aperture is manually variable.

4. A scanning probe according to claim 3, further comprising:
   an aperture position detector for detecting whether the aperture is set to the first width or the second width; and
   a frame rate setter for setting a detection frame rate of the imaging sensor in dependence upon a detected width.

5. A scanning probe according to claim 1, further comprising an aperture adjuster for varying the aperture in response to user input instructions.

6. A scanning probe according to claim 5, further comprising a frame rate setter for setting a detection frame rate of the imaging sensor in dependence upon the user input instructions.

* * * * *